United States Patent
Katayama et al.

(10) Patent No.: US 7,164,786 B2
(45) Date of Patent: Jan. 16, 2007

(54) IMAGE SENSING AND IMAGE PROCESSING APPARATUSES

(75) Inventors: Tatsushi Katayama, Tokyo (JP); Shigeki Okauchi, Kodaira (JP); Nobuo Fukushima, Yokohama (JP); Masakazu Matsugu, Chiba (JP); Katsumi Iijima, Hachioji (JP); Masayoshi Sekine, Tokyo (JP); Kotaro Yano, Yokohama (JP); Sunao Kurahashi, Kawasaki (JP); Motohiro Ishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/429,686

(22) Filed: May 5, 2003

(65) Prior Publication Data

US 2003/0206653 A1 Nov. 6, 2003

Related U.S. Application Data

(63) Continuation of application No. 08/686,683, filed on Jul. 26, 1996, now Pat. No. 6,640,004.

(30) Foreign Application Priority Data

Jul. 28, 1995 (JP) .................................. 7-193596
May 16, 1996 (JP) .................................. 8-121588

(51) Int. Cl.
*G06K 9/00* (2006.01)

(52) U.S. Cl. ...................................................... 382/154

(58) Field of Classification Search ................ 382/106, 382/153, 154, 284, 285, 286, 307; 348/42, 348/47, 211.9
See application file for complete search history.

(56) References Cited

U.S. PATENT DOCUMENTS

| | | | |
|---|---|---|---|
| 3,960,563 A | 6/1976 | Lo et al. | 354/294 |
| 4,344,679 A | 8/1982 | Yagi et al. | 354/25 |
| 4,422,745 A | 12/1983 | Hopson | 354/105 |
| 4,583,117 A | 4/1986 | Lipton et al. | 358/92 |
| 4,727,179 A | 2/1988 | Schmalfuss | 358/100 |
| 4,837,616 A | 6/1989 | Kasano et al. | 358/107 |
| 4,956,705 A | 9/1990 | Wright | 358/88 |
| 5,243,375 A | 9/1993 | Ishida et al. | 354/402 |
| 5,602,584 A | 2/1997 | Mitsutake et al. | 382/154 |
| 5,638,461 A | 6/1997 | Fridge | 382/141 |

FOREIGN PATENT DOCUMENTS

EP    056 3737    10/1993

*Primary Examiner*—Duy M. Dang
(74) *Attorney, Agent, or Firm*—Morgan & Finnegan, L.L.P.

(57) ABSTRACT

Images sensed through object lenses 100R and 100L, having zoom lenses, with image sensors 102R and 102L are processed by image signal processors 104R and 104L, and an image of an object in each of the sensed images is separated from a background image on the basis of the processed image signals. The separated image signals representing the image of the object enter the image processor 220, where a three-dimensional shape of the object is extracted on the basis of parameters used upon sensing the images. The parameters are automatically adjusted so that images of the object fall within the both image sensing areas of the image sensors 102R and 102L and that they fall within the both focal depths of the image sensors 102R and 102L.

2 Claims, 39 Drawing Sheets

FIG. 12
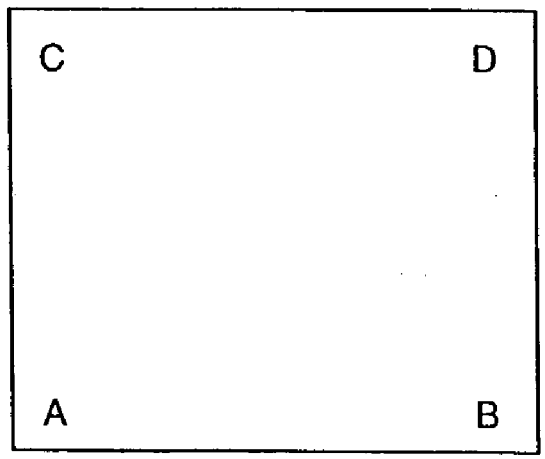
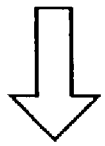
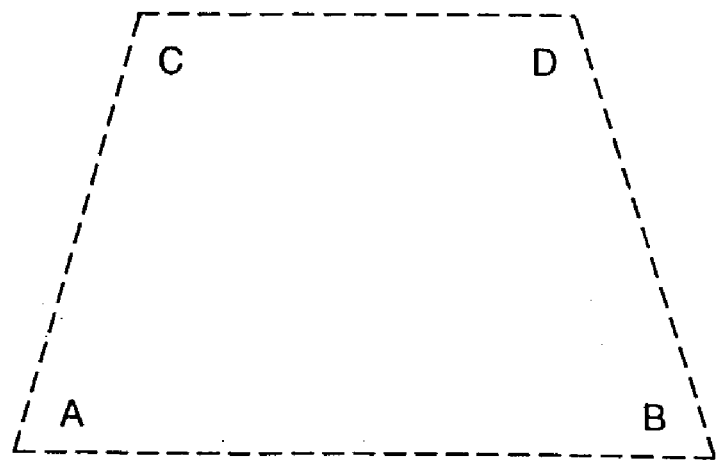

| IMAGE SENSING POINT | POSTURE INFORMATION | IMAGE SENSING PARAMETER | RIGHT IMAGE | LEFT IMAGE |
|---|---|---|---|---|
| $A_0$ | | | | |
| $A_1$ | | | | |
| $A_2$ | | | | |
| ⋮ | | | | |

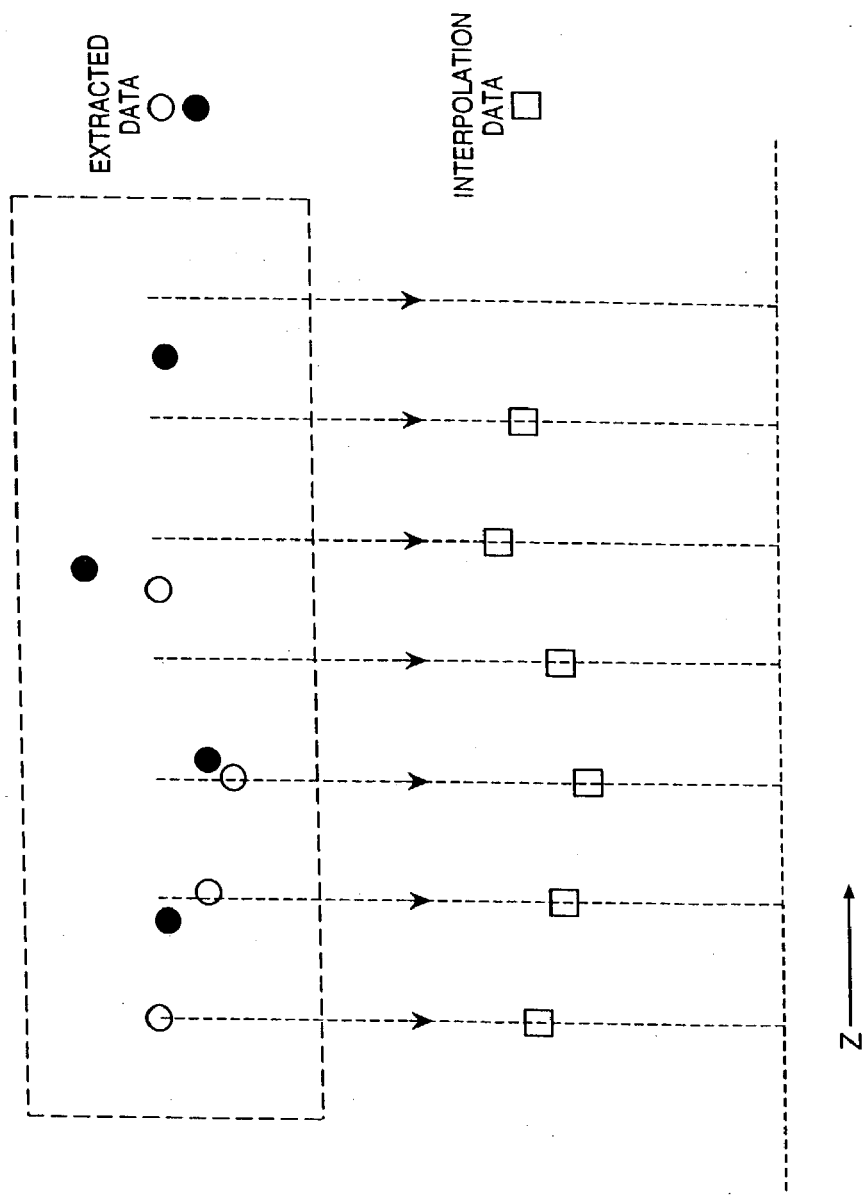

LOW LUMINANCE PORTION

LOW LUMINANCE PORTION

IMAGE SENSING AND IMAGE PROCESSING APPARATUSES

This is continuation application Ser. No. 08/686,683, filed Jul. 26, 1996, now U.S. Pat. No. 6,640,004.

BACKGROUND OF THE INVENTION

The present invention relates to an image sensing apparatus capable of determining an optimum image sensing conditions for obtaining a three-dimensional image. Further, the present invention also relates to an image processing apparatus which edits a three-dimensional image in accordance with the image sensing conditions.

Conventionally, there is a technique, such as the one published on the Journal of Television Society, Vol. 45, No. 4 (1991), pp. 453–460, to obtain a three-dimensional shape of an object. There are basically two methods, a passive method and an active method, for obtaining the three-dimensional shape of the object, as described in the above article.

A typical method as the passive method is a stereo imaging method which performs triangulation on an object by using two cameras. In this method, corresponding points of a part of an object are searched in both the right and left images, and the position of the object in the three dimensional space is measured on the basis of the difference between the positions of the searched corresponding points in the right and left images.

Further, there are a method using a range finder and a slit projection method as the typical active method. In the former method, distance to the object is obtained by measuring time since emitting light toward the object until receiving the light reflected by the object. In the latter method, a three-dimensional shape is measured on the basis of deformation of a shape of a light pattern, whose original pattern is a slit shape, projected on an object.

However, the main purpose of the aforesaid stereo imaging method is to calculate information on distance between fixed positions where the cameras are set and the object, and not to measure the entire object. Consequently, a three-dimensional shape can not be obtained in high precision.

Further, an apparatus adopting the active method is large, since it has to emit a laser beam, for example, to an object, thereby manufacturing cost is high.

Generation of a three-dimensional shape of the object on the basis of two-dimensional images requires a plurality of images sensed at a plurality of image sensing points. However, since the object has a three-dimensional shape, image sensing parameters (e.g., depth of focus, angle of view) which are suited to the object and each image sensing point needs to be set for performing image sensing from a plurality of image sensing points.

However, in any of the aforesaid methods, cameras are not controlled flexibly enough to respond to a dynamic image sensing method, such as sensing an object while moving around it.

Therefore, the present invention is aimed to solve the aforesaid problem, i.e., to realize a dynamic image sensing method in which an object is sensed at a plurality of image sensing points around it.

Meanwhile, an image of an object which is seen from an arbitrary viewpoint is sometimes reproduced on a two-dimensional display on the basis of obtained three-dimensional data of the object.

For example, it is possible to input images sensed by an electronic camera into a personal computer, or the like, and edit them. In this case, a scene is divided into a plurality of partial scenes, and then is sensed with an electronic camera. The images corresponding to the plurality of partial scenes is projected with having some overlapping portions. More specifically, the sensed images are inputted into a personal computer, then put together by using an application software so that the overlapping portions are projected overlapped each other. Thereby, it is possible to obtain an image of far wider angle of view than that of an image obtained in a single image sensing operation by the electronic camera.

However, the main purpose of the aforesaid stereo imaging method is to calculate information on distance between a fixed position where the camera is set and the object, and not to measure the three-dimensional shape of the entire object.

Further, since a laser beam is emitted to the object in the active method, it is troublesome to use an apparatus adopting the active method. Furthermore, in any conventional method, cameras are not controlled flexibly enough to respond to a dynamic image sensing method, such as sensing an object while moving around it.

In addition, two view finders are necessary in the conventional passive method using two cameras, and it is also necessary to perform image sensing operation as seeing to compare images on the two view finders, which increases manufacturing cost and provides bad operability. For instance, there are problems in which it takes time to perform framing or it becomes impossible to obtain a three-dimensional shape because of too small overlapping area.

Further, an image generally dealt with in an office is often printed out on paper eventually, and types of images to be used may be a natural image and a wire image which represents an object with outlines only. In the conventional methods, however, to display an image of an object faithfully on a two-dimensional display on the basis of obtained three-dimensional shape data of the object is the main interest, thus those methods are not used in offices.

SUMMARY OF THE INVENTION

The present invention has been made in consideration of aforesaid situation, and has as its object to provide an image sensing apparatus capable of placing an object, whose three-dimensional shape is to be generated, under the optimum image sensing conditions upon sensing the object from a plurality of image sensing points without bothering an operator.

It is another object of the present invention to provide an image sensing apparatus capable of setting sensing parameters for an optical system so that an entire object falls within the optimum depth of focus at image sensing points.

Further object of the present invention is to provide an image sensing apparatus which senses an image of the object with the optimum zoom ratio at each of a plurality of image sensing points.

Yet further object of the present invention is to provide an image sensing apparatus capable of notifying an operator of achievement of the optimum image sensing conditions.

Yet further object of the present invention is to provide an image sensing apparatus capable of storing the optimum image sensing conditions.

Yet further object of the present invention is to provide an image sensing apparatus which determines whether the optimum image sensing conditions are achieved or not by judging whether there is a predetermined pattern in an image sensing field.

Yet further object of the present invention is to provide an image sensing apparatus capable of re-sensing an image.

Yet further object of the present invention is to provide an image sensing apparatus whose operability is greatly improved by informing an operator when he/she is to press a shutter.

Yet further object of the present invention is to provide an image sensing apparatus capable of instinctively knowing a displacing speed of a camera upon inputting an image, thereby improving operability as well as quality of an input image.

Yet further object of the present invention is to provide a single-eye type image sensing apparatus capable of inputting an image of high quality thereby obtaining a three-dimensional shape in high precision and reliability.

Yet further object of the present invention is to provide an image sensing apparatus capable of always sensing characteristic points to be used for posture detection within a field of view, thereby preventing failing an image sensing operation.

Yet further object of the present invention is to provide an image processing apparatus capable of generating an image of an object which is seen from an arbitrary viewpoint on the basis of three-dimensional shape information on images sensed at a plurality of image sensing points, and capable of forming a file.

Yet further object of the present invention is to provide an image processing apparatus capable of generating an image of an object which is seen from an arbitrary viewpoint on the basis of three-dimensional shape information on images sensed at a plurality of image sensing points, and capable of forming a file, further editing three-dimensional image by synthesizing the file with other file.

Yet further object of the present invention is to provide an image processing apparatus which generates a three-dimensional image from images sensed under the optimum image sensing conditions.

Yet further object of the present invention is to provide an image processing apparatus which converts three-dimensional shape data, obtained based on sensed images, into a two-dimensional image of an object which is seen from an arbitrary viewpoint.

Yet further object of the present invention is to provide an image processing apparatus which combines a document file and a three-dimensional image.

Yet further object of the present invention is to provide an image processing apparatus which stores information on background of an object.

Yet further object of the present invention is to provide an image processing apparatus which combines an image data file with other file, and has a three-dimensionally displaying function.

Yet further object of the present invention is to provide an image processing apparatus in which three-dimensional shape data of an object is calculated with a software installed in a computer, the three-dimensional shape data of the object is converted into an image of the object seen from an arbitrary viewpoint, and a file of the image data is combined with other file.

Yet further object of the present invention is to provide an image sensing apparatus capable of detecting overlapping areas in a plurality of images sensed at a plurality of image sensing points.

Yet further object of the present invention is to provide an image sensing apparatus which displays overlapping portions of images sensed at a plurality of image sensing points in a style different from a style for displaying non-overlapping portions.

Yet further object of the present invention is to provide an image processing apparatus capable of re-sensing an image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is an explanatory view showing a principle of detecting a posture according to the first modification;

FIG. 29 is an explanatory view for briefly explaining an interpolation method according to the second embodiment;

DETAILED DESCRIPTION OF THE PREFERRED EMBODIMENTS

Preferred embodiments of the present invention will be described in detail in accordance with the accompanying drawings.

The present invention discloses an image processing apparatus which obtains images of an object sensed at a plurality of image sensing points, generates a three-dimensional image from these images and displays it. An image processing apparatus described in a first embodiment is characterized by three-dimensional shape recognition, especially by that the optimum image sensing parameters are decided upon to sense the images of the object. As for an image processing apparatus described in a second embodiment, it is characterized by correcting a three-dimensional image on the basis of predetermined image sensing parameters or editing a three-dimensional image.

Figure 1:
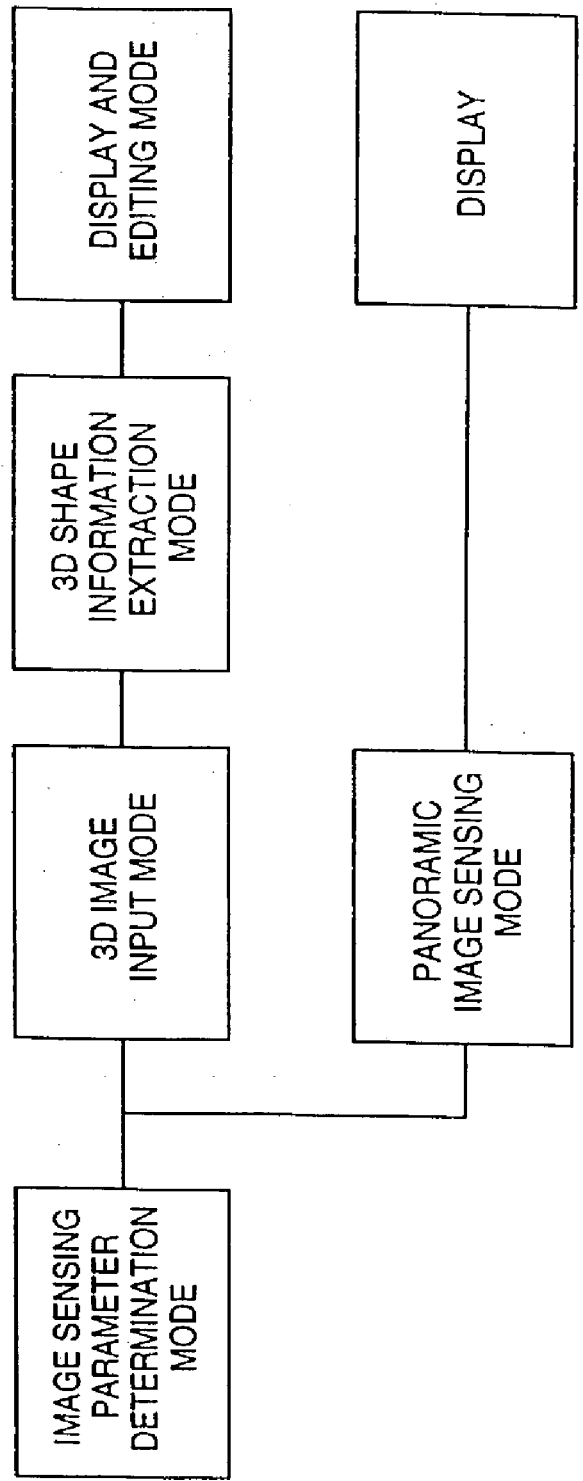
FIG. 1 is an explanatory view for explaining modes set in the image processing apparatuses according to first and second embodiments.

FIG. 1 is an explanatory view for explaining modes set in the image processing apparatuses according to the first and second embodiments. In an image sensing parameter determination mode, the optimum image sensing parameters are determined. In a three-dimensional shape information extraction mode, three-dimensional shape information of an object is extracted from images of the object sensed at a plurality of image sensing points by using image sensing parameters determined in the image sensing parameter determination mode. In a display and editing mode, a three-dimensional image is configured from three-dimensional shape information, displayed and further edited. In a panoramic image sensing mode, a panoramic image is generated by synthesizing images sensed at a plurality of image sensing points by using a function, originally performed for extracting three-dimensional shape information, for sensing a plurality of images from a plurality of image sensing points. Further, a three-dimensional image input mode is furnished.

<First Embodiment> ΔDetermination of Image Sensing Parameters

Overall Configuration

Figure 2:
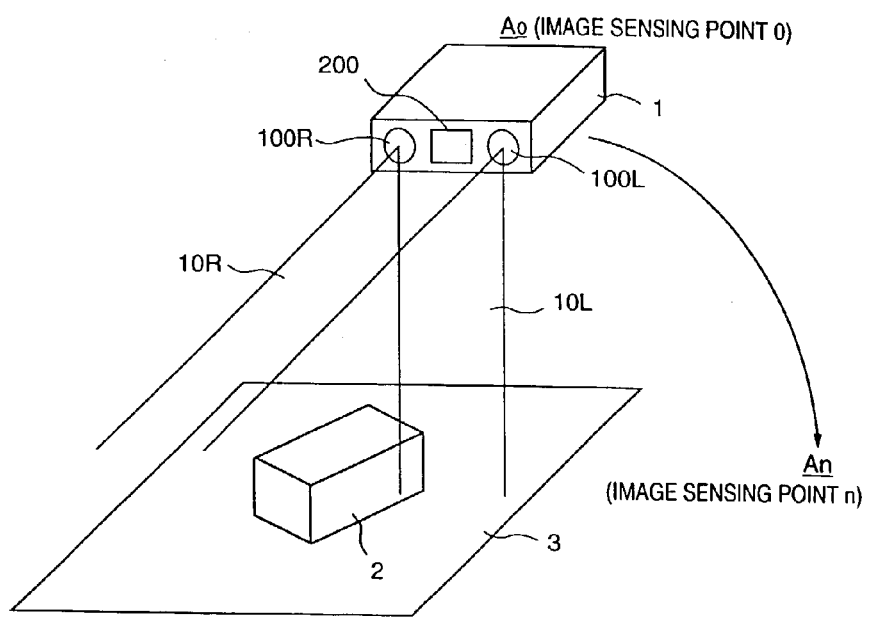
FIG. 2 is an overall view illustrating a configuration of a three-dimensional shape recognition apparatus according to a first embodiment of the present invention.

FIG. 2 is an overall view illustrating a configuration of a three-dimensional shape recognition apparatus according to a first embodiment of the present invention. It is necessary to decide the most suitable image sensing parameters for recognizing three-dimensional shape information from images. The most suitable image sensing parameters make it easy to recognize, in high precision, three-dimensional shape information of an object. The three-dimensional shape recognition apparatus shown in FIG. 2 adopts a method of determining image sensing parameters of the present invention in order to realize reliable three-dimensional shape recognition in high precision. More specifically, in the apparatus shown in FIG. 2, after the most suitable image sensing parameters are determined, an optical system is set in accordance with the image sensing parameters, then the apparatus senses images of the object and recognizes three-dimensional shape information of the object of interest.

In FIG. 2, reference numeral 1 denotes an apparatus (called "three-dimensional shape information extracting apparatus", hereinafter) for extracting three-dimensional shape information of an object; and 2, an object whose three-dimensional shape information is to be extracted, and the object 2 becomes a subject of a camera for obtaining the three-dimensional shape information of the object by an image processing in the present invention. Further, reference numeral 3 denotes a stage set behind the object 2, and it constitutes a background of the object 2.

In the three dimensional shape information extracting apparatus 1, reference numeral 100R denotes a right object lens; and 100L, a left object lens. Further, reference numeral 200 denotes an illumination unit for illuminating the object 2 in accordance with an image sensing environment. The image sensing field of the right object lens 100R is denoted by reference numeral 10R, and the image sensing field of the left object lens 100L is denoted by reference numeral 10L. The three dimensional shape information extracting apparatus 1 is mounted on a vibration-type gyro (not shown), for example, and the position of the three dimensional shape information extracting apparatus 1 is detected by a posture detector 201 (refer to FIG. 3) which is also mounted on the vibration-type gyro.

The three dimensional shape information extracting apparatus 1 senses the object 2 while moving from the start position $A_0$ of the image sensing to the end position $A_n$ of the image sensing. Further, position information and posture information of the three dimensional shape information extracting apparatus 1 at each image sensing point between $A_0$–$A_n$ are calculated from signals obtained from the posture detector 2.

Figure 3:
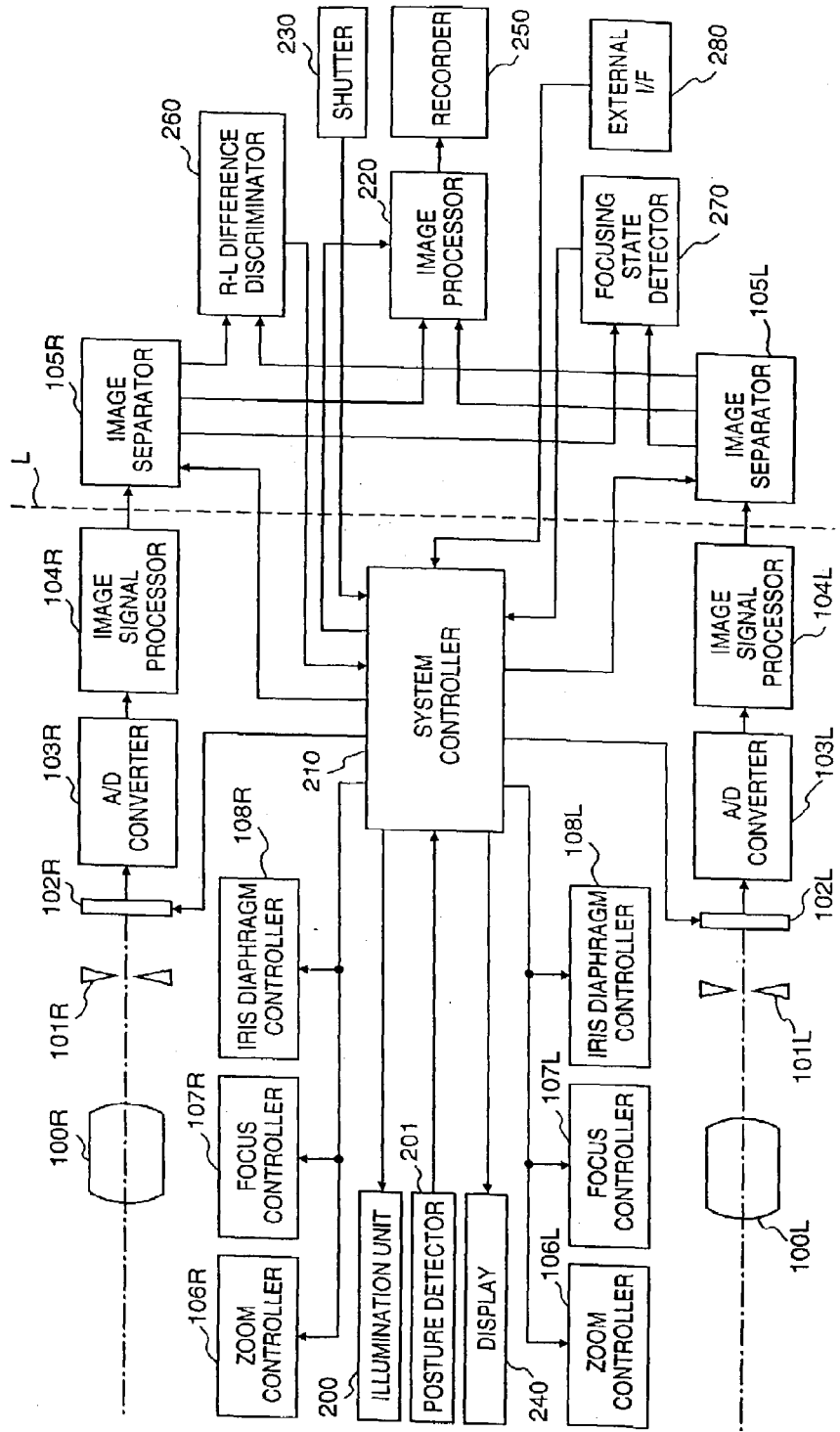
FIG. 3 is a block diagram illustrating a configuration of a three dimensional shape information extracting apparatus according to the first embodiment.

FIG. 3 is a block diagram illustrating a configuration of the three dimensional shape information extracting apparatus (referred to as "parameter extracting apparatus" hereinafter) 1.

In FIG. 3, reference numerals 100R and 100L denote the object lenses consisting of zoom lenses. Further, reference numerals 101R and 101L denote iris diaphragms; and 102R and 102L, image sensors and CCDs can be used as those. A/D converters 103R and 103L convert signals from the image sensors into digital signals. Image signal processors 104R and 104L convert the digital signals from the A/D converters 103R and 103L into image signals of a predetermined format (e.g., image signals in the YIQ system or image signals in the Lab system). Image separators 105R and 105L separate an image of the object 2 from an image of the background 3.

Zoom controllers 106R and 106L adjust focal lengths of the object (zoom) lenses 100R and 100L. Focus controllers 107R and 107L adjust focal points. Iris diaphragm controllers 108R and 108L adjust aperture diaphragm of the iris diaphragms 101R and 101L.

Figure 4:
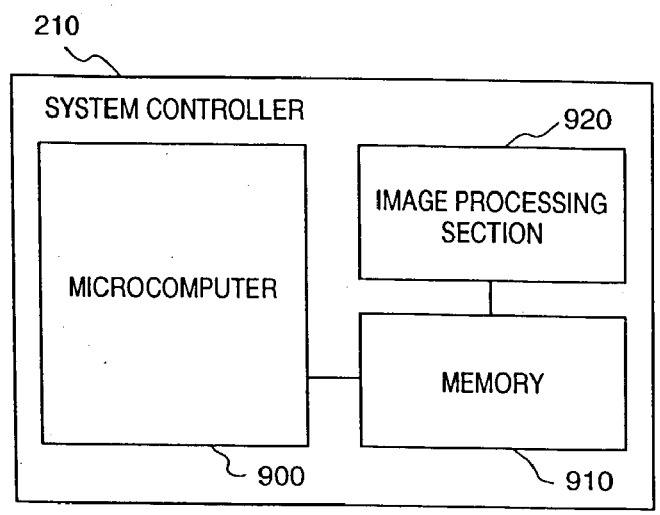
FIG. 4 is a block diagram illustrating a configuration of a system controller shown in FIG. 3.

Reference numeral 201 denotes the posture detector which consists of a vibration-type gyro and so on, and it outputs signals indicating the position and posture of the camera. Reference numeral 210 denotes a system controller which controls the overall parameter extracting apparatus 1. The system controller 210, as shown in FIG. 4, consists of a microcomputer 900, memory 910 and an image processing section 920. Reference numeral 220 denotes an image processor which extracts three-dimensional information of the object on the basis of the image signals obtained from the image sensors 102R and 102L, as well as outputs data after combining the three-dimensional information extracted at each image sensing point and posture information at each image sensing point obtained by the posture detector 201. Reference numeral 250 denotes a recorder for recording an image.

A focusing state detector 270 detects a focusing state of the sensed image on the basis of the image of the object 2 and the image of the background 3 separated by the image separators 105R and 105L. An R–L difference discriminator 260 calculates the differences between the obtained right image sensing parameters and left image sensing parameters.

Furthermore, reference numeral 230 denotes a shutter; 280, an external interface for external input; and 240, a display, such as a LED.

Next, an operation of the parameter extracting apparatus 1 having the aforesaid configuration will be explained.

Images of the object 2 are inputted to the image sensors 102R and 102L through the object lenses 100R and 100L, and converted into electrical image signals. The obtained electrical image signals are converted from analog signals to digital signals by the A/D converters 103R and 103L and supplied to the image signal processors 104R and 104L.

The image signal processors 104R and 104L convert the digitized image signals of the object into luminance signals and color signals (image signals in the YIQ system or image signals in the Lab system as described above) of a proper format.

Next, the image separators 105R and 105L separates the image of the object whose three-dimensional shape information is the subject to measurement from the image of the background 3 in the sensed image signals on the basis of the signals obtained from the image signal processors 104R and 104L.

As an example of a separation method, first, sense an image of the background in advance and store the sensed image in the memory (FIG. 4). Then, place the object 2 to be measured in front of the background 3 and sense an image of the object 2. Thereafter, perform matching process and a differentiation process on the sensed image including the object 2 and the background 3 and the image of the background 3 which has been stored in the memory in advance, thereby separating the areas of the background 3. It should be noted that the separation method is not limited to the above, and it is possible to separated images on the basis of information on colors or texture in the image.

The separated image signals of the object 2 are inputted to the image processor 220, where three-dimensional shape extraction is performed on the basis of the image sensing parameters at the image sensing operation.

Next, an operational sequence of the system controller 210 of the parameter extracting apparatus 1 will be described with reference to a flowchart shown in FIGS. 5A, 5B.

Figure 5A:
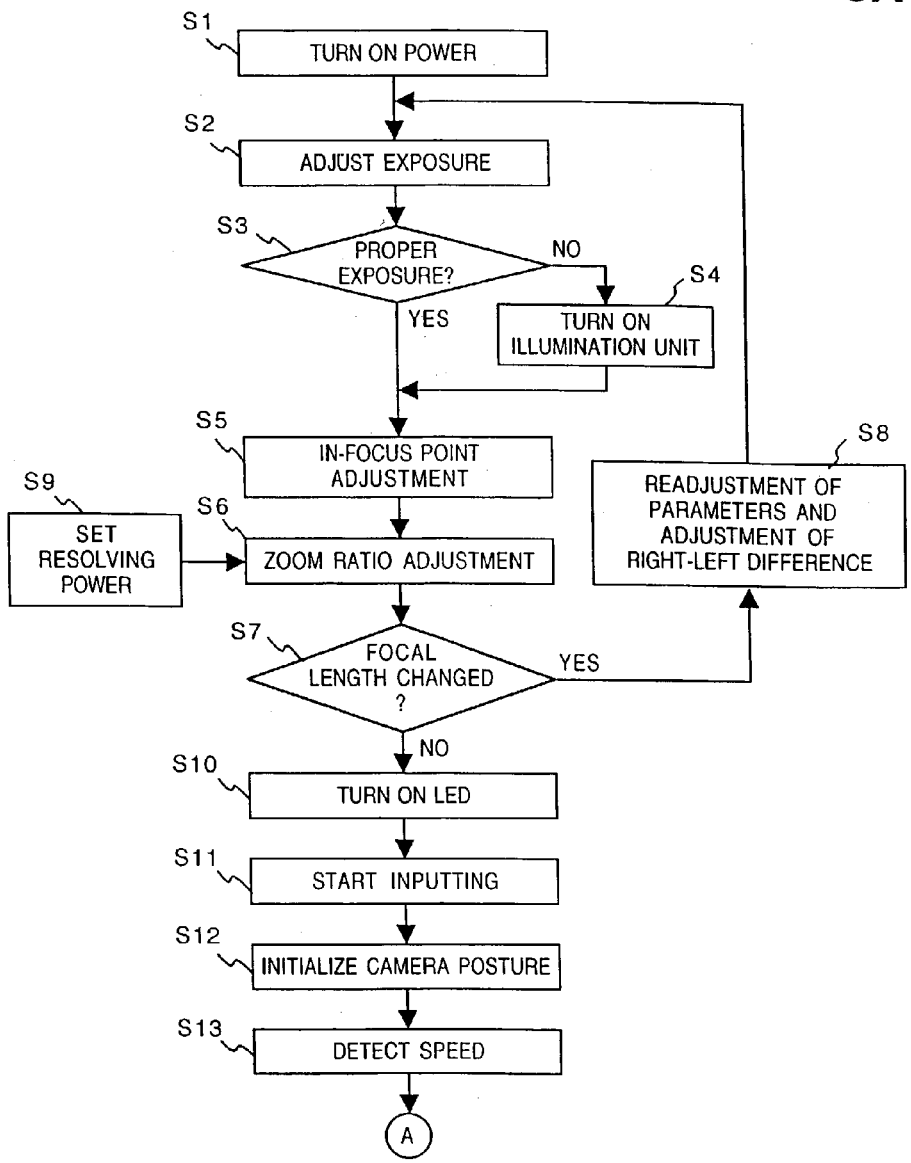
FIGS. 5A, 5B are a flowchart showing an operation according to the first embodiment.
Figure 5B:
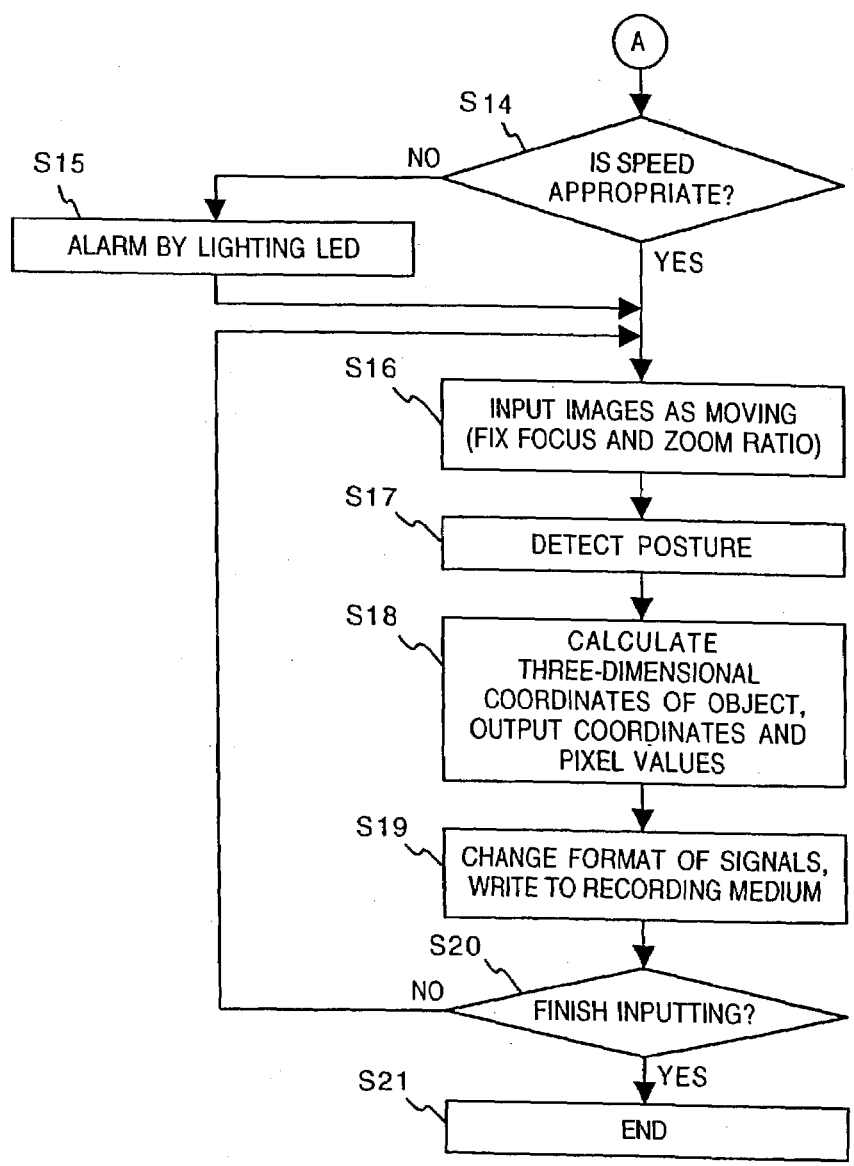

In the flowchart shown in FIGS. 5A, 5B, processes from step S1 to step S9 relate to the "image sensing parameter determination mode". In the "image sensing parameter determination mode", the optimum image sensing parameters for each of n image sensing points, or $A_0$ to $A_n$, shown in FIG. 2.

When a power switch is turned on, each unit shown in FIG. 3 starts operating. When the "image sensing parameter determination mode" is selected, the system controller 210 starts controlling at step S1. More specifically, the system controller 210 enables the iris diaphragm controllers 108R and 108L and the image sensors 102R and 102L so as to make them output image signals sensed through the lenses 100R and 100L, enables the A/D converters 103R and 103L so as to make them convert the image signals into digital image signals, and controls the image signal processors 104R and 104L to make them convert the digital image signals into image signals of the aforesaid predetermined format (includes luminance component, at least).

As the image signal processors 104R and 104L start outputting the image signals, the system controller 210 adjusts exposure at step S2.

Exposure Adjustment

The system controller 210 controls the image processing section 920 (refer to FIG. 4) to perform an integral processing on the image signals of the object 2 obtained from the image separators 105R and 105L, and calculates a luminance level of the image of the entire object 2. Further, the system controller 210 controls the iris diaphragm controllers 108R and 108L to set the iris diaphragms 101R and 101L to proper aperture diaphragms on the basis of the luminance level. At step S3, whether the luminance level obtained at step S2 is not high enough to extract three-dimensional shape information and any control of the iris diaphragms

101R and 101L will not result in obtaining a proper luminance level or not is determined. If it is determined that the proper level is not obtained, then the illumination unit 200 is turned on at step S4. Note, the intensity level of the illumination unit 200 may be changed on the basis of the luminance level calculated at step S2.

In-focus Point Adjustment (Step S5)

The system controller 210 adjusts the focal lengths at step S5 by using the right and left image signals which are set to a proper luminance level. The parameter extracting apparatus 1 shown in FIG. 3 has the focus controllers 107R and 107L, thus adjustment for focusing is unnecessary. Therefore, the in-focus point adjustment performed at step S5 is an adjustment of focus so that the entire image of the object is within the focal depths of the lenses 100R and 100L.

Figure 6:
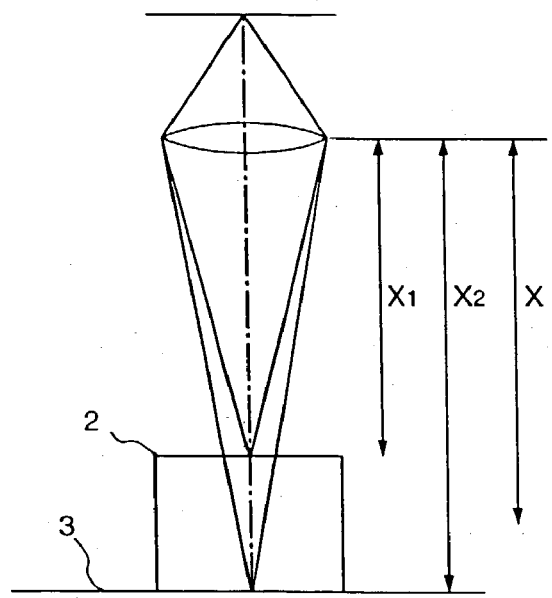
FIG. 6 is an explanatory view for explaining in-focus point adjustment.

A principle of the in-focus point adjustment process performed at step S5 will be shown in FIG. 6.

First, the in-focus points of the lenses 100R and 100L are set at the upper part of the object 2, then set at the lower part of the object 2. The lower part of the object 2 can not be usually seen from the lenses 100R and 100L, therefore, the in-focus points of the lenses 100R and 100L are adjusted to the background 3 in practice at step S5.

Note, the focusing state in this process is detected by the focusing state detector 270. As for a detection method, a known method, such as detection of clarity of edges or detection of a blur from image signals, may be used.

The aforesaid focusing operation on the two parts, i.e., the upper and the lower parts of the object, are performed for each of the right and left lenses 100R and 100L, reference numerals $X_1$ and $X_2$ in FIG. 6 represent focuss to the upper and lower parts of the object 2 of either the right or left lens. The focusing state detector 270 outputs the values of $X_1$ and $X_2$ to the system controller 210. Then, the system controller 210 determines a focal length X with which the depth of focus is determined for the object 2 on the basis of the values, then outputs a control signal so as to obtain the focus distance X to the corresponding focus controller 107R or 107L. The distance X may be a middle length between $X_1$ and $X_2$, for example, $$X = \frac{X_1 + X_2}{2} \tag{1}$$

In practice, for each of the right and left lenses, $$X_R = \frac{X_{1R} + X_{2R}}{2} \tag{2}$$

$$X_L = \frac{X_{1L} + X_{2L}}{2} \tag{3}$$

Alternatively, proper weights may be applied, and the equation (1) becomes, $$X = \frac{m \cdot X_1 + n \cdot X_x}{2} \tag{4}$$

The range in the X direction in which the entire object 2 is within the depth of focus of the lenses 100R and 100L is denoted by $X_1'{\sim}X_2'$ when the object lenses 100R and 100L focus at the distance X denoted by the equation (1), then the upper limit of the range $X_1'$ and the lower limit of the range $X_2'$ can be expressed as follow.

$$X_1' = \frac{X_1 \cdot f^2}{f^2 + \delta \cdot F \cdot (X_1 - f)} \tag{5}$$

$$X_2' = \frac{X_2 \cdot f^2}{f^2 + \delta \cdot F \cdot (X_2 - f)} \tag{6}$$

Here, f denotes the focal length of the lenses 100R and 100L, F denotes a F number (=aperture diameter/focal length), and δ denotes the diameter of the circle of least confusion. It should be noted that the size of a pixel of the image sensors 102R and 102L can be considered as δ, for example.

Accordingly, in a case where the system controller 210 tries to control the lenses 100R and 100L to focus at the distance X expressed by the equation (1), it can obtain a clear image of the object 2 in the aforesaid range between $X_1'{\sim}X_2'$. Therefore, the system controller 210 controls the aperture diaphragm, or the aperture diameter of the iris diaphragm 101, by controlling the iris diaphragm controllers 108R and 108L so that the F number which achieves the closest match between respective $X_1'$ and $X_2'$ satisfying the equations (5) and (6), and $X_1$ and $X_2$ of the equations (1) to (3).

Thus, the focal length and aperture diaphragm are decided so that a clear image can be obtained in the entire range in the depth direction of the object 2 (in the X direction) by performing the operational sequence of steps S2 to S5.

Note, in a case where the luminance level is changed more than a predetermined value by the processing at step S5, it can be dealt with by changing the intensity of the illumination unit 200. Another way to deal with this situation is to additionally provide an AGC (automatic gain control) circuit to correct the level electrically.

Zoom Ratio Adjustment (Step S6)

Next at step S6, zoom ratio is adjusted so that the entire object 2 is in the field of view of the camera. In order to generate a three-dimensional image of the object, there has to be an overlapping portion in images sensed at at least two image sensing points. In a case where the convergence angle between the right and left lenses is much different from the angles of view of the right and left lenses, there would not be any overlapping portion in the images. Therefore, by maximizing an overlapping portion, a three-dimensional image of a wide area can be realized.

FIGS. 7A to 7D are explanatory views showing a brief zoom ratio adjustment performed at step 86.

The system controller 210 stores images obtained from the image sensors 102R and 102L when the object 2 is basically in the focal depth $X_1'{\sim}X_2'$ in the memory 910 (FIG. 4) as well as detects an overlapping portion of the object 2 by using the image processing section 920. The overlapping portion is represented by image signals included in the both images of the object sensed by the right and left lenses. The overlapping portion is shown with an oblique stripe pattern in FIGS. 7A and 7D. As a method of detecting the overlapping portion, a correlation operating method which takes correlation by comparing the obtained right and left images, or a template matching processing which searches a predetermined image that is set in the template from the right and left images, for instance, may be used.

The zoom ratio adjustment at step S6 is for adjusting the zoom ratio so that the area of the overlapping portion becomes maximum.

Figure 7A:
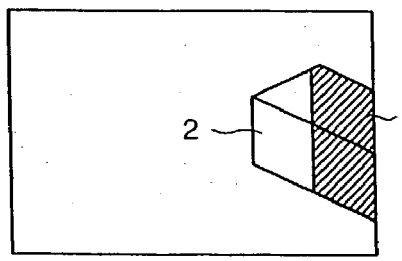
FIGS. 7A to 7D are explanatory views showing zoom ratio adjustment.

In order to do so, the controller 210 detects the overlapping portion 500 between the right and left images of the object 2 sensed by the right and left lenses 100R and 100L, as shown in FIG. 7A, by using the aforesaid method. Next, the zoom ratios of the lenses 100R and 100L are changed so as to increase the area of the overlapping portion 500 (e.g., in FIGS. 7C and 7D), then the controller 210 outputs control signals to the zoom controllers 106R and 106L.

Figure 8:
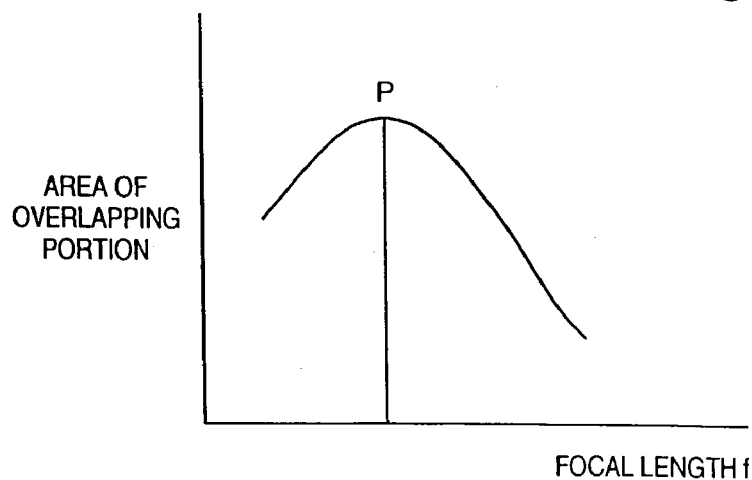
FIG. 8 is a graph for explaining the zoom ratio adjustment.

FIG. 8 is a graph showing change of the area of the overlapping portion 500 of the object 2 in frames in accordance with the zoom ratio adjustment.

In FIG. 8, the focal length f of the lenses 100R and 100L at which the area of the overlapping portion 500 reaches the peak P is calculated by the image processing section 920 of the controller 210, then the controller 210 gives a control signal to the zoom controllers 106R and 106L so as to obtain the focal length f.

Accordingly, by determining the optimum exposure condition, the optimum aperture diaphragm and the optimum focal length f at steps S2 to S6, it is possible to obtain a clear image of the entire object 2 both in the depth and width directions.

Readjustment of Parameters

In a case where the focal length f is changed by the operation at step S6 which results in changing the depth of focus more than a predetermined value (YES at step S7), the process proceeds to step S8 where the parameters are readjusted. The readjustment performed at step S8 is to repeat the processes at steps S2 to S7.

Adjustment of Right-Left Difference

In the adjustment of right-left difference performed at step S8, the right-left differences of the exposure amounts (aperture diaphragm), the aperture values F and the zoom ratios (focal length f) of the right and left optical systems are detected by the R–L difference discriminator 260, and each optical system is controlled so that these differences decrease. More specifically, in a case where a differences between the right and left lenses on the aperture diaphragms (will affect the exposure amounts and the focal depths) and the focal lengths (will affect the focal depths and an angles of field of view) obtained for the right and left optical systems at steps S1 to S7 are more than a threshold, the image sensing parameters obtained for the right optical system are used for both of the right and left optical systems. In other words, if the respective image sensing parameters for the right optical system differ from the corresponding image sensing parameters for the left optical system, then the image sensing parameters for the right optical system is used as the parameters for the system shown in FIG. 2.

Setting of Resolving Power (Step S9)

In recognizing three-dimensional shape information, information for expressing the actual distance to an object is in the form of parameters which specify the shape of the object. The aforesaid $X_1$ and $X_2$ are only the distances in the camera space coordinate system but not the real distances to the object. Therefore, the parameter extracting apparatus of the first embodiment finds the actual distance to the object as an example of shape parameters.

Distance information Z to the object can be expressed by the following equation.

$$Z = \frac{f \cdot b}{d} \qquad (7)$$

Here, f denotes a focal length of the optical system; b, base line length; and d, parallax.

In order to recognize three-dimensional shape information in better precision by performing image processing, the resolving power at the distance Z with respect to the parallax is important. The resolving power at the distance Z is defined by the following equation.

$$\frac{\partial Z}{\partial d} = -\frac{f \cdot b}{d^2} \qquad (8)$$

In this system, the resolving power is considered as one of the image sensing parameters, and constructed so as to be set from outside by an operator. The equation (8) indicates that, when the resolving power is given, then the focal length changes in accordance with the resolving power. In other words, $$f = -\frac{d^2}{b} \cdot \frac{\partial Z}{\partial d} \qquad (9)$$

It is possible to set the resolving power from an external computer, or the like, through the external I/F 280 at step S9 and to set a focal length f in accordance with the equation (9) based on the resolving power upon adjusting focal length at step S5 in the flowchart shown in FIGS. 5A, 5B.

Accordingly, the optimum image sensing parameters for each of n image sensing points, $A_0$ to $A_n$, can be determined from the processes at steps S2 to S9.

Shape Recognition

In the subsequent steps after step S10, an image of the object 2 is sensed. The image sensing is for recognizing the shape of the object 2, and the image must be sensed under the optimum setting condition for the three-dimensional shape recognition by using the image sensing parameters determined at steps S2 to S9.

First, the system controller 210 gives a signal to the display 240 at step S10, and notifies a user of the completion of the image sensing parameters. The display 240 can be a CRT, LCD, or the like, or can be a simple display using an LED, or the like. Further, sound may be used for notification along with the visual display.

Next, the user confirms the notification by the LED, or the like, then make the system controller 210 start performing the three-dimensional recognition (extraction of shape parameters).

When the user pushes an start inputting button (not shown) at step S11, the posture of the camera is initialized at step S12. The initialization of the posture of the camera performed at step S12 is to initialize the posture of the camera by using the optimum image sensing parameters for an image sensing point of the camera, $A_x$, obtained at steps S2 to S9, where the camera currently is at. This initialization guarantees that the entire object falls within a proper depths of focus.

Next, the parameter extracting apparatus 1 senses the object 2 from different positions while moving from the position $A_0$ toward the position $A_n$ as shown in FIG. 2. In this case, the change of the image sensing parameters is prohibited by the system controller 210 since the start inputting button is pushed until a stop button is pushed.

While the parameter extracting apparatus 1 moves, the posture and the speed of the displacement of the apparatus 1 are detected by the posture detector 201 provided inside of the apparatus 1 at step S13. In a case where the detected speed of the displacement is not within an appropriate range at step S14, this is notified to the user by lighting the LED of the display 240 at step S15.

At step S16, the user inputs an image by pressing the shutter 230 at a predetermined rate. It is possible to notify the user of the timing to press the shutter 230 calculated by the system controller 210 on the basis of the signals detected by the posture detector 201, by lighting the LED of the display 240, for example.

When it is detected that the shutter 230 is pressed, in synchronization with the detection, the system controller 210 calculates posture information at that point from the signals detected by the posture detector 201 at step S17, as well as gives the calculated posture information to the image processor 220. Thereafter, at step S18, the image processor 220 calculates the three dimensional coordinates of the objects from the posture information and the image signals of the right and left images, then outputs the calculated coordinates to the recorder 250 along with pixel values thereof.

At step S19, the recorder 250 converts the inputted signals to signals in a proper format, and writes the formatted signals on a recording medium. After that, the processes at step S17 to S20 are repeated until it is determined that all the image signals have been inputted at step S20. When all the image signals have been inputted, the process is completed at step S21.

<First Modification>

Figure 9:
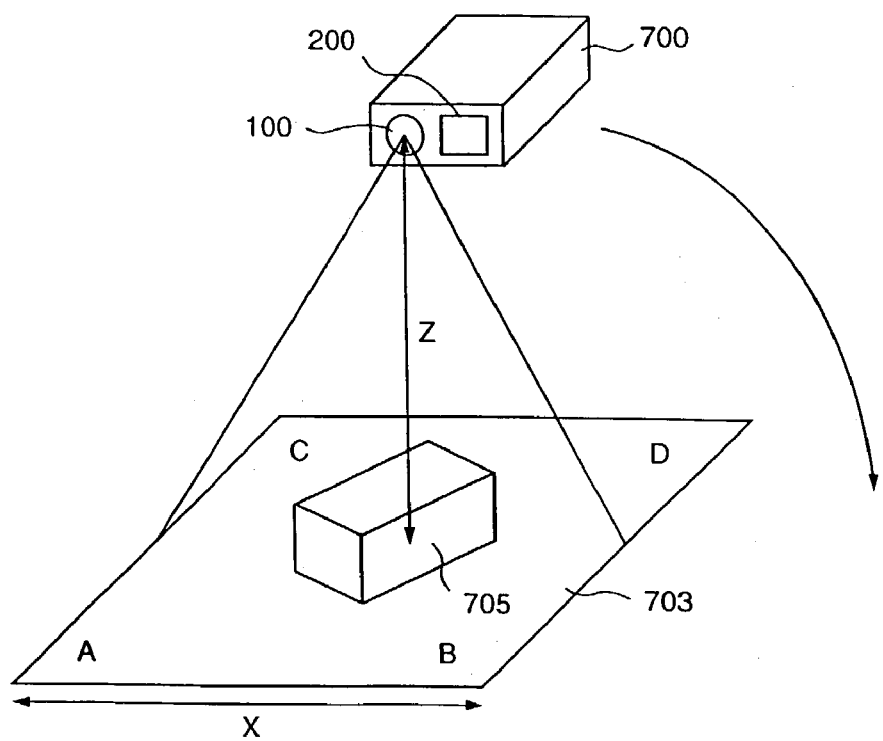
FIG. 9 is an overall view illustrating a brief configuration of a three-dimensional shape recognition apparatus according to a first modification of the first embodiment.

FIG. 9 is an overall view illustrating a brief configuration of a three-dimensional shape recognition apparatus according to a modification of the first embodiment. In contrast to a double-eye camera used in the first embodiment, a single-eye camera is used in the first modification.

The first modification is performed under the "panoramic image sensing mode" shown in FIG. 1.

In FIG. 9, reference numeral 705 denotes an object; 700, a parameter extracting apparatus; 100, an object lens; and 200, an illumination unit.

Reference numeral 703 denotes a pad on which the object 705 is placed, and respective characters, "A", "B", "C" and "D" are written in the four corners of the pad 703 as markers. The pad 703 serves as a background image as in the first embodiment, as well as provides information for posture recognition, which is specific to the first modification, to the parameter extracting apparatus 700. In other words, the parameter extracting apparatus 700 calculates its posture on the basis of the direction, distortion, and other information, of the image of the letters, "A", "B", "C" and "D", written on the pad 703.

Figure 10:
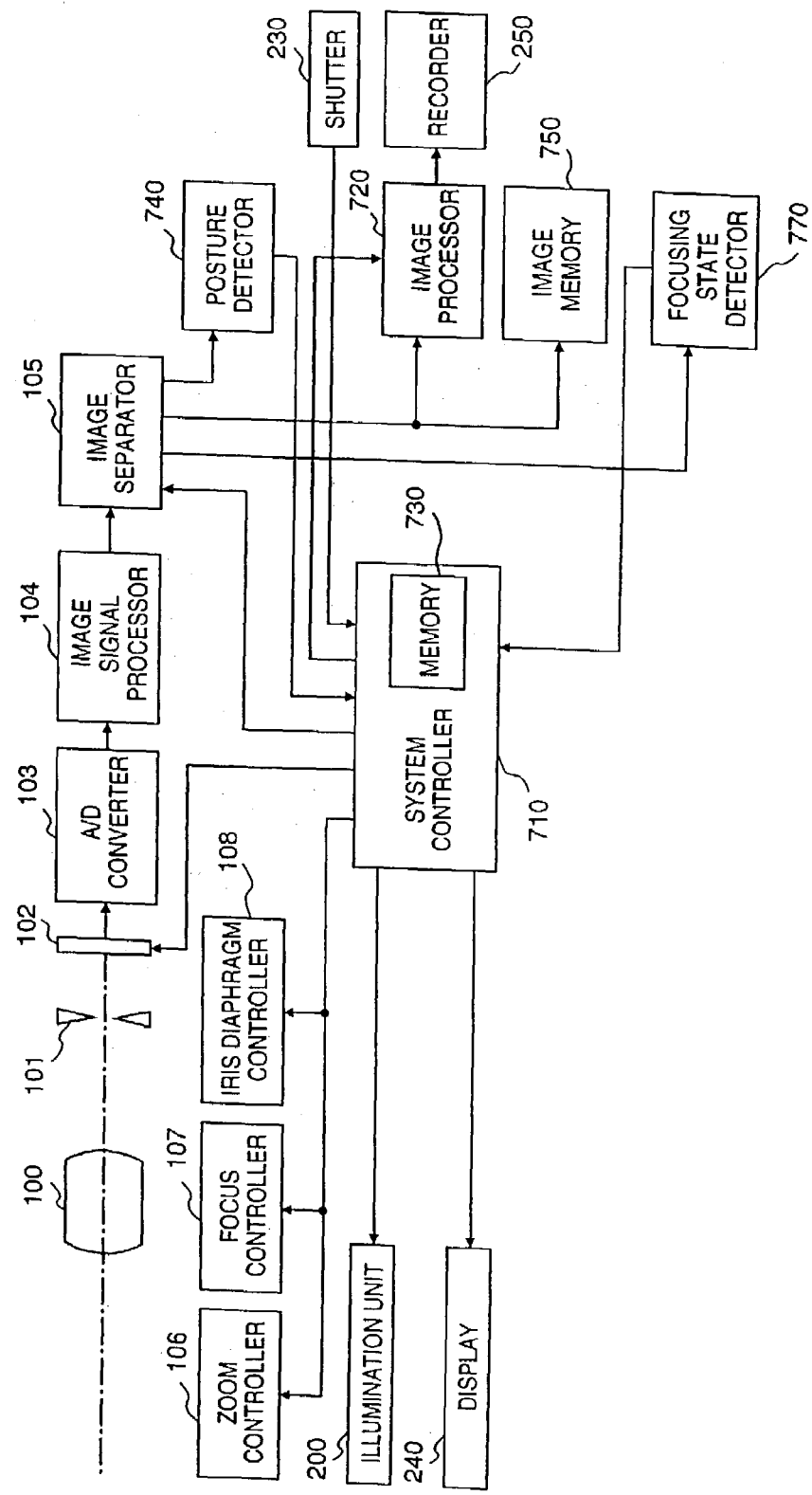
FIG. 10 is a block diagram illustrating a configuration of a three dimensional shape information extracting apparatus according to the first modification.

FIG. 10 is a block diagram illustrating a configuration of the parameter extracting apparatus according to the first modification. It should be noted that, in FIG. 10, the units and elements referred by the same or similar reference numerals as the number parts of the reference numerals in FIG. 3 have the same functions and operate in the same manner.

In FIG. 10, reference numeral 100 denotes the object lens which may consist of a zoom lens. Further, reference numeral 101 denotes an iris diaphragm; 102, an image sensor, such as CCD; 103, an A/D converter; 104, an image signal processor; and 105, an image separator for separating the object image from a background image.

Further, reference numeral 740 denotes a posture detector which detects a posture of the parameter extracting apparatus 700 on the basis of the direction, distortion, and other information, of the markers written on the pad 703. Reference numeral 720 denotes an image processor for extracting three-dimensional shape information of the object 705 from the image signals and the posture information; 770, a focusing state detector which has the same function and operates in the same manner as the focusing state detector 270 in the first embodiment, except the focusing state detector 770 has only one lens; 750, an image memory; 710, a system controller which controls the entire apparatus; and 730, a memory provided in the system controller 710.

Next, an operation of the first modification will be described with reference to a flowchart shown in FIG. 11.

Figure 11:
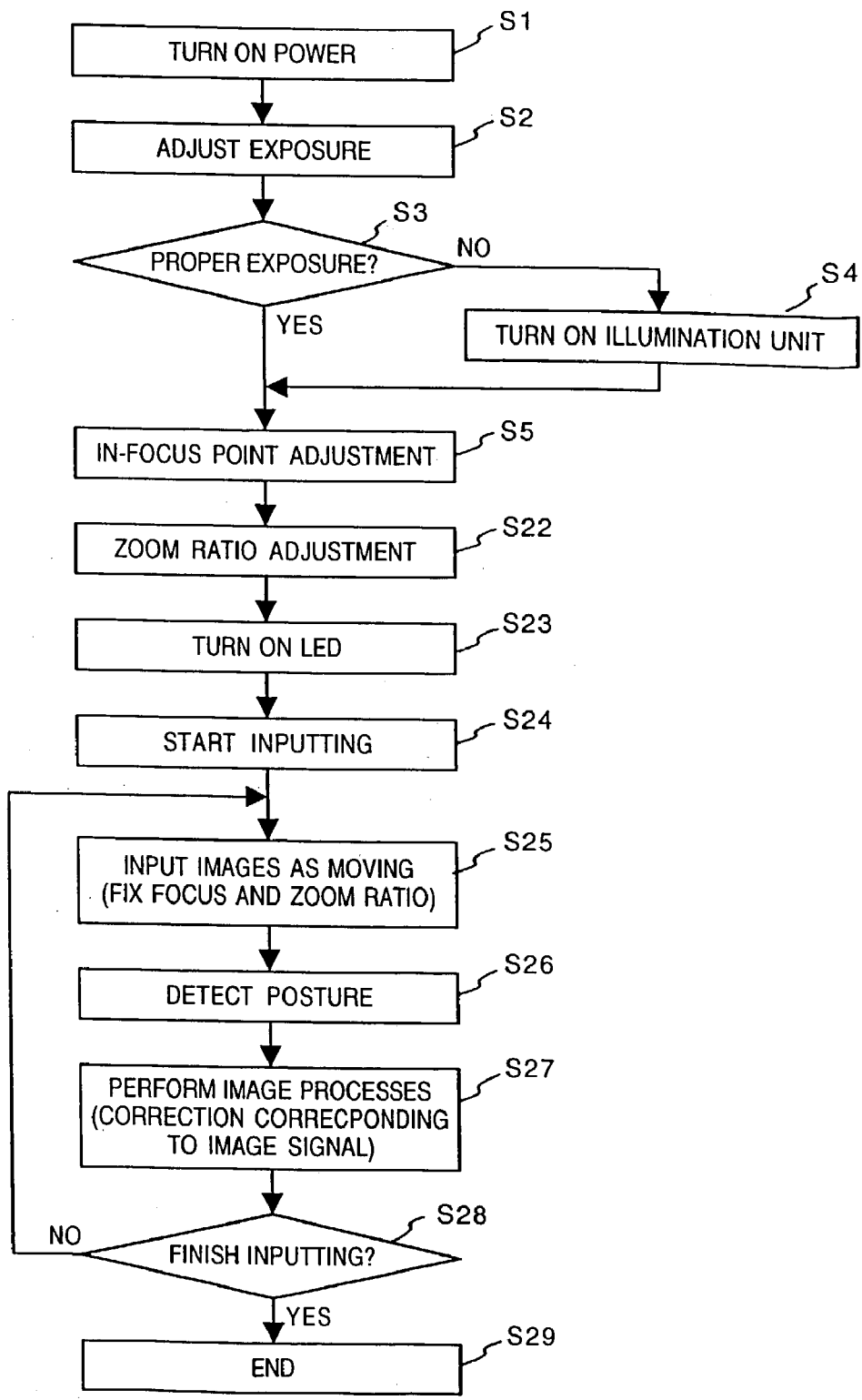
FIG. 11 is a flowchart showing an operation according to the first modification.

The processes at steps S1 to S5 shown in FIG. 11 are performed on a single image signal as in the case of the processes shown in FIGS. 5A, 5B (first embodiment).

The point which is different from the first embodiment is a method of adjusting the zoom ratio at step S22. More specifically, the pad 703 is placed at an appropriate position in advance to the image sensing operation, since the parameter extracting apparatus 700 in the first modification detects its posture in accordance with the image of the pad 703. Thereafter, the image separator 105 performs correlation operation or template matching between a reference pattern of the markers (i.e., four letters, "A", "B", "C" and "D", on four corners as shown in FIG. 9) on the pad 703 and the current image of the pad 703. Then, an image of each marker is extracted, and a position detection signal of the image of the marker is outputted to the system controller 710. The system controller 710 controls the zoom controller 106 to set the focal length f so that the markers on the pad 703 are inside of a proper range of the field of view. At the same time, information about the focal length f is stored in the memory 730 in the system controller 710.

Thereby, the entire view of the 703 can be always put within the field of view, thus the posture can be always detected on the basis of the shapes of the markers. More specifically, the markers are written on the four corners of the pad 703, and an operator puts the object 705 inside of the four corners in the first modification. Therefore, whenever the parameter extracting apparatus 700 can recognize all the four markers, the object 705 is within the field of view of the parameter extracting apparatus 700.

The aforesaid processing is the contents of the "zoom ratio adjustment" at step S22.

Note that, according to the principle of the first modification, four markers are not necessarily needed, and three markers may be enough as far as the object is placed inside of the three markers. Further, the markers are not limited to letters, and can be symbols. Furthermore, they do not have to be written on the pad 703, and can be in the form of stickers which can be replaced freely.

After image sensing parameters for the optical system are set in the processes at the steps S2 to S22, an LED of the display 240 is lit at step S23 to notify the user that the apparatus is ready for input.

In response to this notification, the user starts inputting at step S24, and presses the shutter 230 at some intervals as moving the parameter extracting apparatus 700 at step S25, thereby inputting images. Upon this operation, the system controller 710 adjusts a focal length so that all the markers are always within an appropriate range of the field of view of the camera on the basis of information from the image separator 105 so that the object 705 is always in the field of view of the camera. Further, the image parameter information, including the focal length, is stored in the memory 730 at each image sensing point. With this stored information, the posture detector 740 detects the posture of the parameter extracting apparatus 700 from the detected position of the markers (refer to FIG. 12).

At the succeeding step S27, the image processor 720 performs an image processing for the three-dimensional recognition.

More specifically, the image processor 720 reads out a plurality of image signals (at each of image sensing points, $A_0$ and $A_1$ to $A_n$) stored in the image memory 750. Thereafter, it corrects read-out images and converts them into images in the same focal state on the basis of the image sensing parameters stored in the memory 730 in the system controller 710. Further, the image processor 720 extracts three-dimensional shape information of the object 705 from the corrected image signals and a posture signal obtained by the posture detector 740, then outputs it to the recorder 250. The recorder 250 converts the inputted signals into signals of a proper format, then records them into a recording medium. Images are inputted until the input at all the image sensing point is completed at step S28, thereafter, the process is ended at step S29.

<Second Modification>

Figure 13:
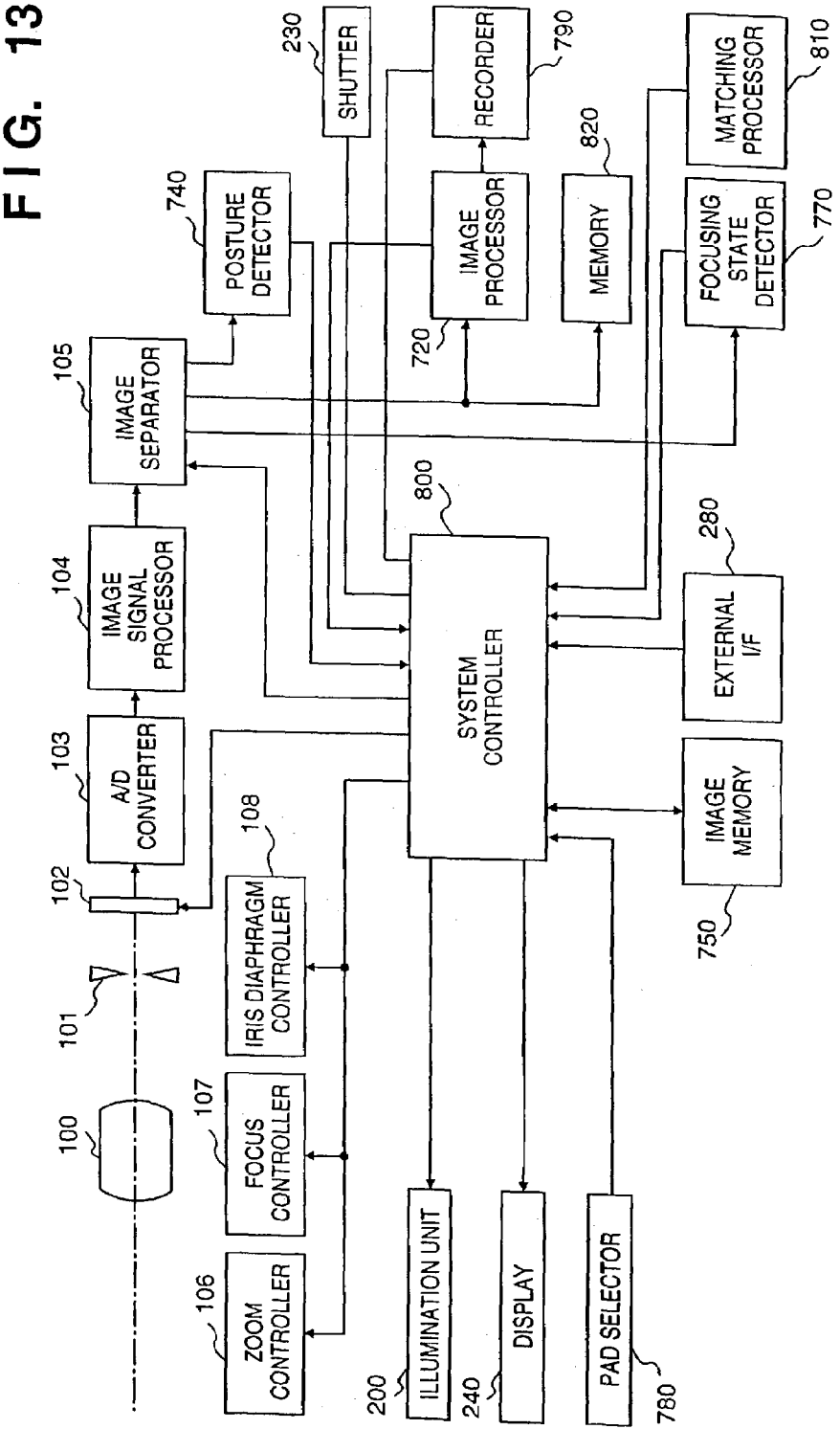
FIG. 13 is a block diagram illustrating a configuration of a three dimensional shape information extracting apparatus of a second modification of the first embodiment.

FIG. 13 is a block diagram illustrating a configuration of a parameter extracting apparatus of a second modification. In the second modification, a pad written with markers is used as in the first modification, however, it differs from the first modification in the point in that the number of the pads used in the second modification is plural. Further, the second modification is further characterized in the point in which image sensing operation can be redone at arbitrary positions.

In FIG. 13, the same units and elements refereed by the same reference numerals as those in FIG. 2 (first embodiment) and FIG. 10 (first modification) have the same functions and operate in the same manner, and explanations of those are omitted.

In FIG. 13, reference numeral 820 denotes a memory for storing information on each of a plurality of pads. A user can select the type of the pad 703 through a pad selector 780 (e.g., keyboard). Reference numeral 790 denotes a recorder which records three-dimensional shape information as well as the image sensing parameters. This also has a function of reading out the stored information when necessary. Reference numeral 800 denotes a system controller having the same function as of the system controller 210 in the first embodiment, and controls the entire apparatus. Reference numeral 810 denotes a matching processor for performing matching process, based on pixel information, between three-dimensional shape information, recorded in advance, which is read out by the recorder 790 and an image currently sensed.

Figure 14:
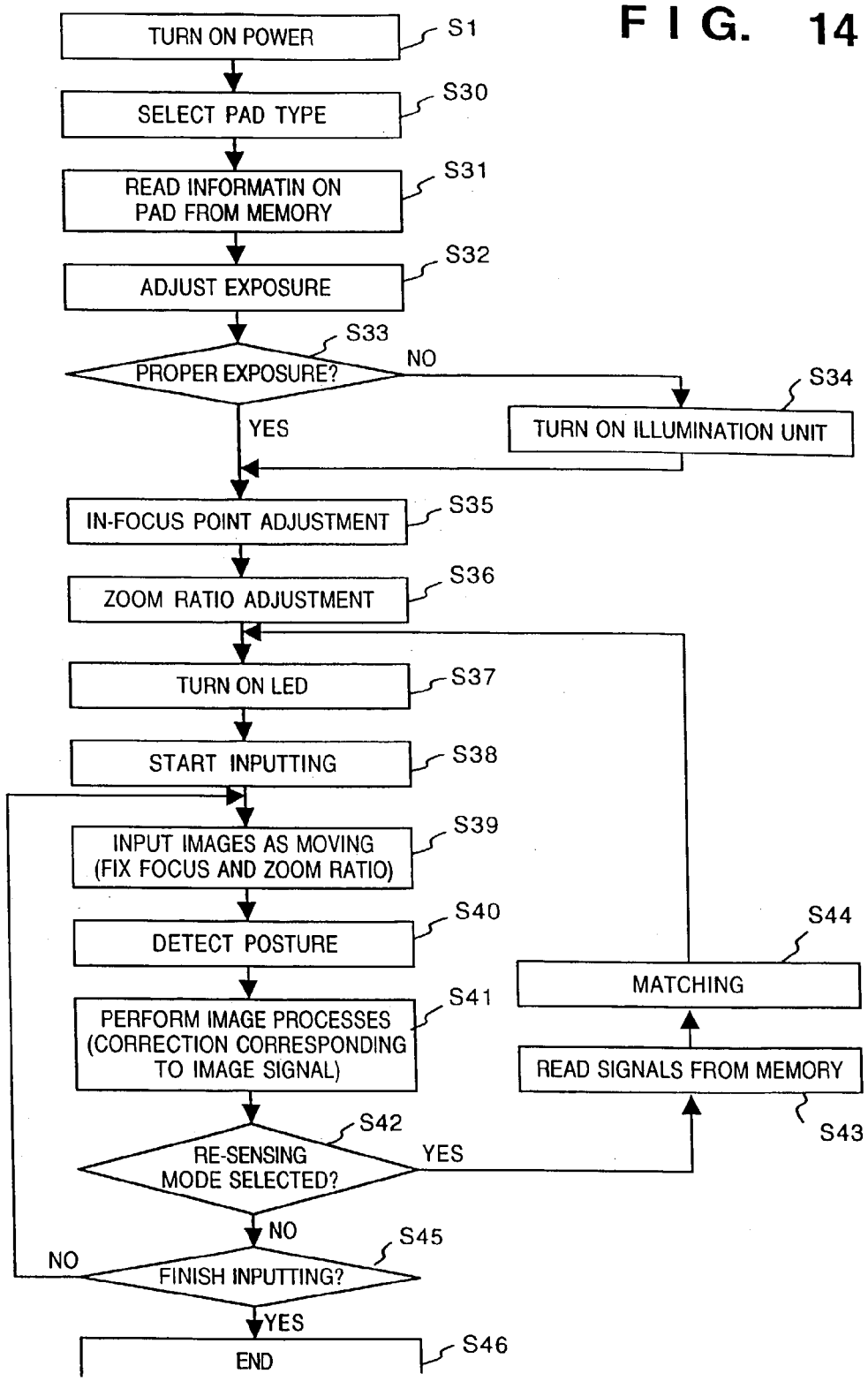
FIG. 14 is a flowchart showing an operation according to the second modification.

Next, an operation of the second modification will be described with reference to a flowchart shown in FIG. 14.

After the power is turned on at step S1, the user selects the type of the pad 703 by the pad selector 780 at step S30. Next, the system controller 800 reads out information on the selected pad from the memory 820 on the basis of the input selection information at step S31, then uses the information for focal length control, focusing control, posture detection, and so on.

According to the second modification, the user can select a pad to be used as a background out of a plurality of pads with markers, thus it is possible to set the background which is most suitable to the shape and size, for example, of an object whose shape is to be recognized. As a result, the image sensing parameters which are most suitable to the object can be determined. Therefore, the precision of the three-dimensional shape recognition on the basis of images obtained by using the optimum image sensing parameters can be improved.

Next, the three-dimensional recognition process according to the second modification will be described. The processes at steps S32 to S41 are the same as the processes at step S2 to S27 explained in the first modification. More specifically, the image sensing parameters are determined at steps S32 to S36, then three-dimensional shape information of the object is extracted at steps S37 to S41.

In an image sensing processing performed at a plurality of image sensing points at steps S39 to S45, there may be some cases in which the images sensed at specific image sensing points should be sensed again. In such a case, the user selects a re-sensing mode through the pad selector 780. This selection is detected at step S42. The user must move the parameter extracting apparatus 700 at a position where the object is to be re-sensed. Then, the system controller 800 makes the recorder 790 read images which have been sensed and recorded at step S43. Then, at step S44, the system controller 800 performs matching operation between the currently sensed image and the plurality of read-out images, and specifies an image to be replaced.

When the area currently sensed and the read signals are corresponded by the matching operation, then the LED, for example, in the display 240 is lit at step S37 to notify the user that the apparatus is ready for input. Then at steps S38 and S39, the previously sensed image is replaced by the currently input image.

It should be noted that, when the object is re-sensed at step S42, it is possible to change the position of the object 705 on the pad 703. In this case, too, the previously recorded image is matched to the currently input image, and input process starts from a base point where the points in the two images are corresponded.

Further, in a case of terminating the input operation and re-sensing images of the object, the recorder 790 reads out the image sensing parameters in addition to a previously recorded three-dimensional shape information and pixel signals, and input operation is performed after setting the same image sensing parameters to those previously used in the image sensing operation.

Further, in a case of using a pad 703 which is not registered in the memory 820, the pad 703 is to be registered through the external I/F 280 from a computer, or the like.

In a case where no image of the object is to be re-sensed, the processes at steps S39 to S42 are repeated until finishing inputting images, then terminated at step S46.

As explained above, the three-dimensional shape recognition apparatus is featured by determination of the optimum image sensing parameters and storage of images, and performs three-dimensional shape extraction in high precision by using the optimum image sensing condition parameters.

It should be noted that the units which are in the right side of a dashed line L can be configured separately from the parameter extracting apparatus of the first embodiment, and may be provided in a workstation, a computer, or the like.

Next, a three-dimensional shape extraction apparatus, to which an image sensing apparatus of the present invention is applied, according to the second embodiment will be described.

\<Second Embodiment\> . . . Edit a Three-dimensional Image

A configuration of a three-dimensional image editing system to which the present invention is applied is described below.

The three-dimensional shape extraction apparatus according to the second embodiment is for displaying and editing a three-dimensional image by applying a principle of the method of determining the image sensing parameters described in the first embodiment (i.e., the three-dimensional shape extraction mode, the display and editing mode and the panoramic image sensing mode which are shown in FIG. 1).

Configuration of the System

A configuration of the three-dimensional image editing system according to the second embodiment is explained below.

Figure 15:
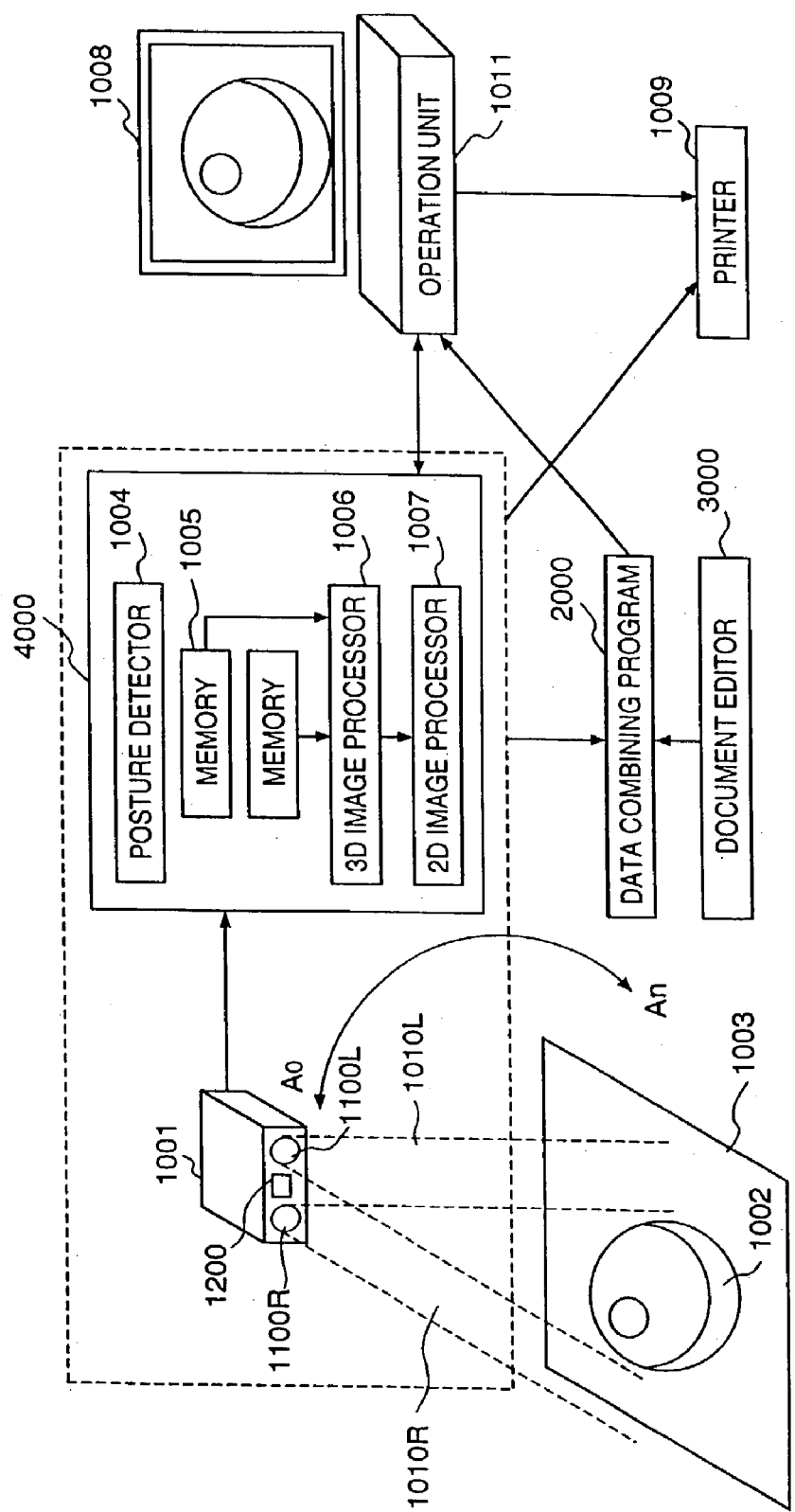
FIG. 15 is a brief view of a three-dimensional shape extraction apparatus and its peripheral equipment according to the second embodiment.

FIG. 15 is a brief view of the three-dimensional shape extraction apparatus and the environment in which the apparatus is used according to the second embodiment.

The system shown in FIG. 15 has an image sensing head (camera head) 1001, an image processing apparatus 4000, a monitor 1008, an operation unit 1011, a printer 1009, and programs 2000 and 3000 for combining data and editing a document. The image sensing head 1001 adopts multi-lens image sensing systems. Reference numerals 100L and 1100R respectively denote left and right object lenses (simply referred as "right and left lenses", hereinafter), and 1010L and 1010R denote image sensing areas for the right and left lenses 100L and 1100R, respectively. Further, these image sensing areas have to be overlapped in order to obtain a three-dimensional image.

Further, reference numeral 1002 denotes an object; 1003, a background stage to serve as a background image of the object 1002; and 1200, an illumination unit for illuminating the object 1002. The illumination unit 1200 illuminates the object in accordance with the image sensing environment.

Reference numeral 1004 denotes a posture detector for detecting a posture of the image sensing head 1001 when sensing an image. The posture detector 1004 has a detection function of detecting a posture (includes posture information) of the image sensing head 1001 by performing image processes on the basis of information obtained from the background stage 1003 and another detection function for physically detecting a posture of the image sensing head 1001 with a sensor, such as a gyro, or the like.

The image sensing head 1001 senses the object 1002 while moving from the starting point $A_0$ for image sensing operation to the end point $A_n$. Along with the image sensing operation performed at each image sensing point between the starting point $A_0$ and the end point $A_n$, the position and posture of the image sensing head 1001 are detected by the posture detector 1004, and detected posture information is outputted.

A memory 1005 stores image data, obtained by the camera head 1001, and the posture information of the camera head 1001, obtained by the posture detector 1004.

A three-dimensional image processor (3D image processor) 1006 calculates three-dimensional shape information of the object on the basis of the image data stored in the memory 1005 and the corresponding posture information of the camera head 1001.

A two-dimensional image processor (2D image processor) 1007 calculates two-dimensional image data of the object seen from an arbitrary viewpoint in a style designated by a user from the three-dimensional image data of the object obtained by the 3D image data processor 1006.

Figure 16:
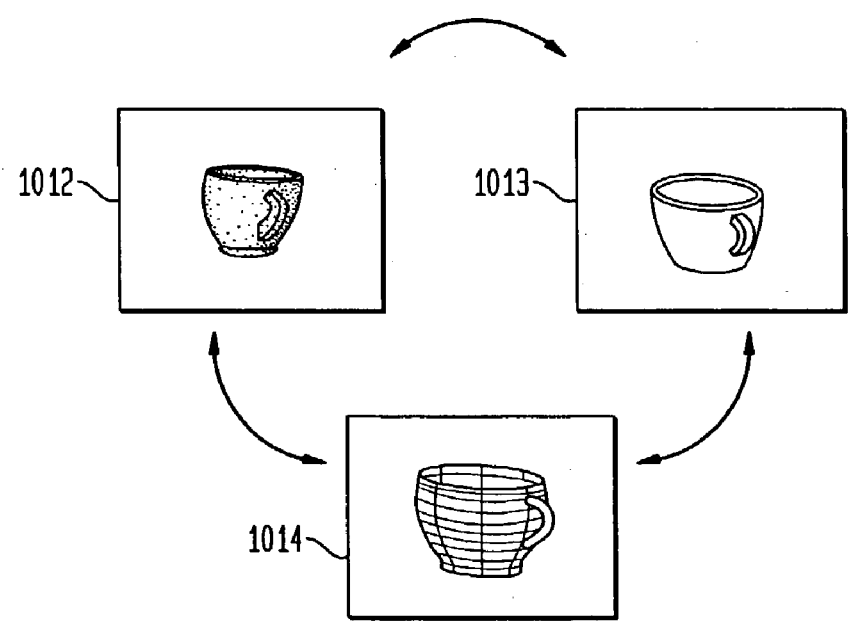
FIG. 16 shows types of images of an object according to the second embodiment.

FIG. 16 shows types of images processing prepared in the image processing apparatus according to the second embodiment. A user selects a type, in which an image is to be outputted, out of the prepared types of images shown in FIG. 16 via the operation unit 1011 shown in FIG. 15.

More concretely, a user can select whether to process an image of the object as a half-tone image (e.g., 1012 in FIG. 16), or as a wire image in which edges of the object are expressed with lines (e.g., 1013 in FIG. 16), or as a polygon image in which the surface of the object is expressed with a plurality of successive planes of predetermined sizes (e.g., 1014 in FIG. 16) via the operation unit 1011 which will be described later.

The document editor 3000 is for editing a document, such as text data, and the data combining program 2000 combines and edits document data and object data obtained by the 2D image processor 1007.

The monitor 1008 displays two-dimensional image data of the object, document data, and so on.

The printer 1009 prints the two-dimensional image data of the object, the document data, and so on, on paper, or the like.

The operation unit 1011 performs various kinds of operation for changing viewpoints to see the object, changing styles of image of the object, and combining and editing various kinds of data performed with the data combining program 2000, for example.

Figure 17A:
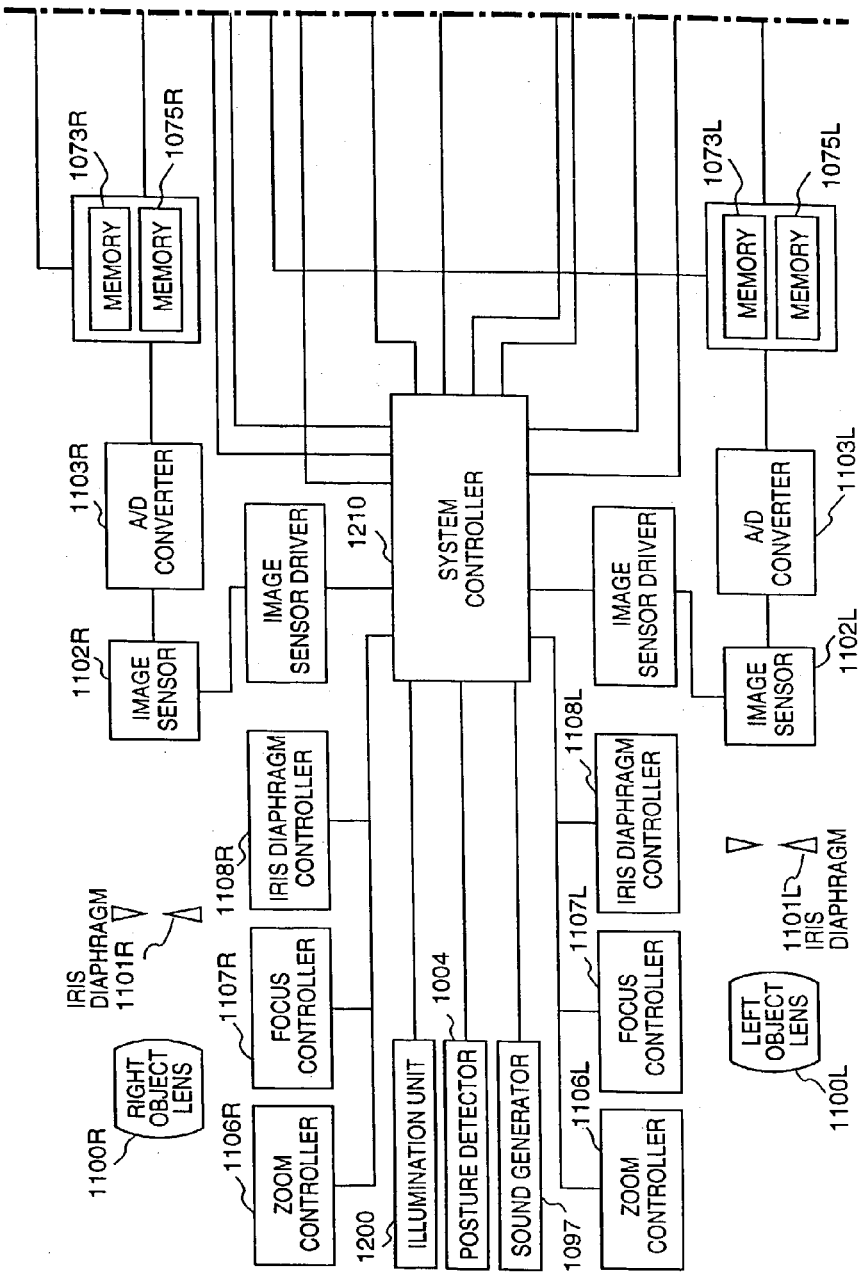
FIGS. 17A, 17B are a block diagram illustrating a detailed configuration of an image sensing head and an image processing unit.
Figure 17B:
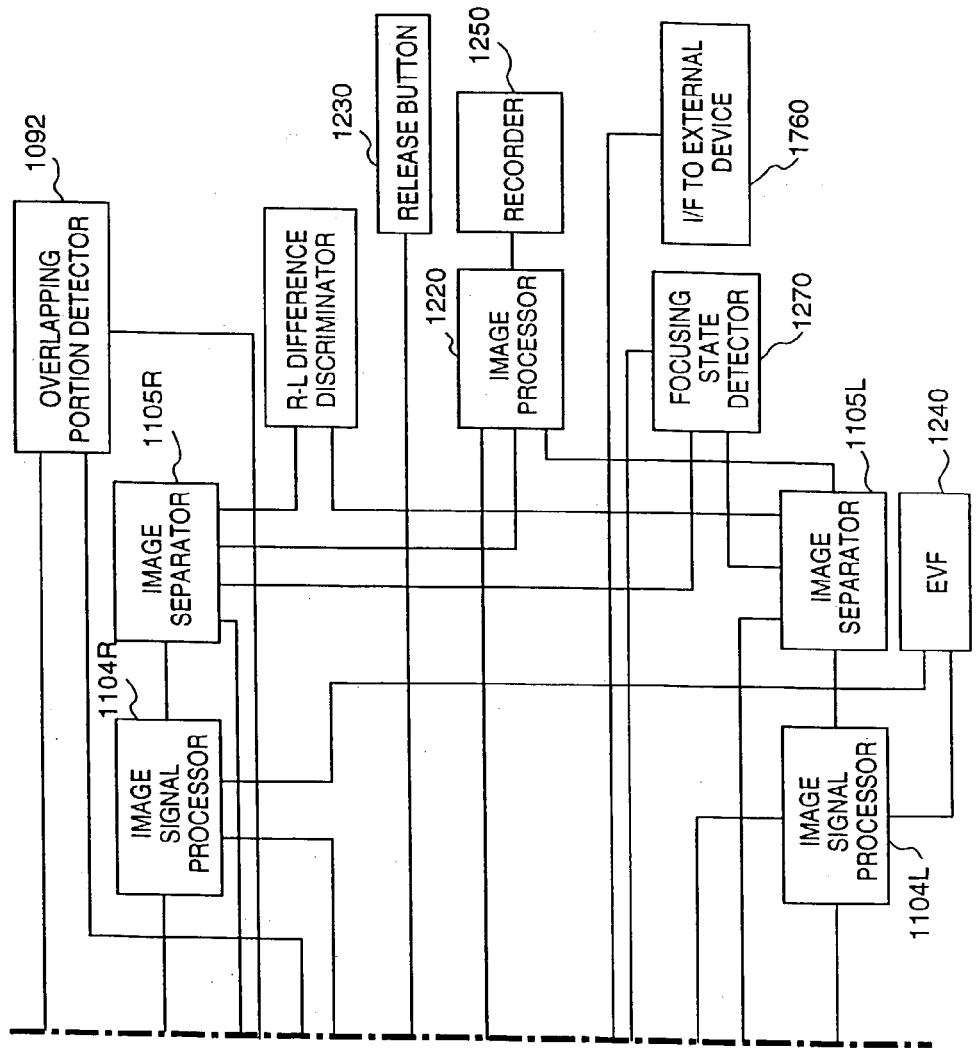

FIGS. 17A, 17B are a block diagram illustrating a detailed configuration of the image sensing head 1001 and the image processing unit (the unit surrounded by a dashed line in FIG. 15), which constitute a three-dimensional shape information extraction block together.

In FIGS. 17A, 17B, the right and left lenses 1100R and 100L consist of zoom lenses.

Functions of iris diaphragms 1101R and 1101L, image sensors 1102R and 1102L, A/D converters 1103R and 1103L, image signal processors 1104R and 1104L, image separators 1105R and 1105L, zoom controllers 1106R and 1106L, focus controllers 1107R and 1107L, iris diaphragm controllers 1108R and 1108L, the posture detector 1004, and so on, are the same as those in the first embodiment.

Figure 18:
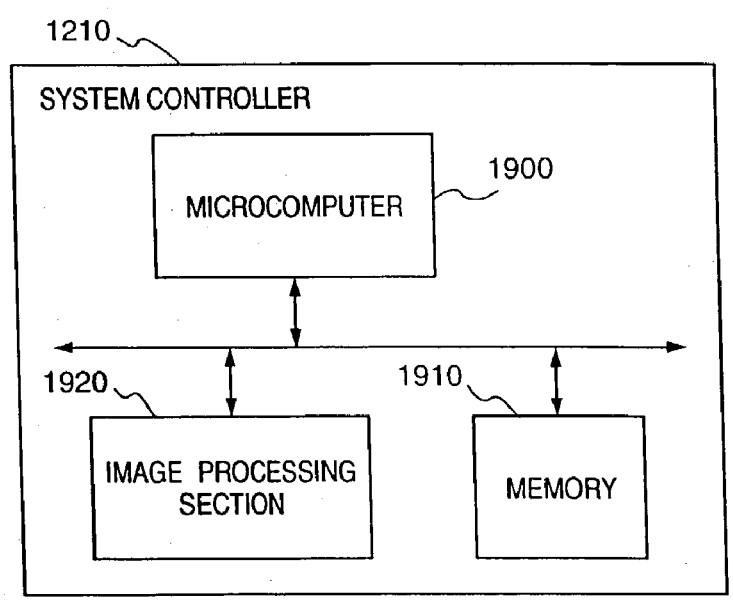
FIG. 18 is a block diagram illustrating a configuration of a system controller.

A system controller 1210 corresponds to the system controller 210 in the first embodiment, and is for controlling the overall processes performed in the three-dimensional shape extraction apparatus. The system controller 1210 is configured with a microcomputer 1900, a memory 1910 and an image processing section 1920, as shown in FIG. 18.

An image processor 1220 corresponds to the image processor 220 explained in the first embodiment, and realizes functions of the memory 1005, the 3D image processor 1006, and the 2D image processor 1007 which are shown in a schematic diagram in FIG. 15. More specifically, the image processor 1220 extracts three-dimensional shape information of the object from image signals of the sensed object. Further, it converts three-dimensional shape information of the object into information in integrated coordinate systems in accordance with posture information of the camera head at each image sensing point obtained by the posture detector 1004.

An detailed operation of a camera portion of the three-dimensional shape extraction apparatus according to the second embodiment will be described below with reference to FIGS. 17A, 17B.

Images of the object are inputted through the lenses 1100R and 100L. The inputted images of the object are converted into electrical signals by the image sensors 1102R and 1102L. The obtained electrical signals are further converted from analog signals to digital signals by the A/D converters 1103R and 1103L, then enter to the image signal processors 1104R and 1104L.

In the image signal processors 1104R and 1104L, the digitized image signals of the object are converted into luminance signals and color signals of appropriate formats. Then, the image separators 1105R and 1105L separate images of the object whose three-dimensional shape information is subject to measurement from a background image on the basis of the signals obtained by the image signal processors 1104R and 1104L.

A method of separating the images adopted by the image separators 105R and 105L in the first embodiment is applicable in the second embodiment.

The separated images of the object enter the image processor 1220 where three-dimensional shape information is extracted on the basis of image sensing parameters used upon sensing the images of the object.

Process of Sensing Images

When a user operates a release button 1230 after facing the camera head 1001 to the object 1002, operation to sense images of the object is started.

Then, the first image data is stored in the memory 1005. In the three-dimensional image input mode, the user moves the camera head 1001 from the image sensing point $A_0$ to the point $A_n$ sequentially around the object.

After the camera head 1001 sensed at an image sensing point $A_m$ in a way from the point $A_0$ to the point $A_n$ and when the posture detector 1004 detects that the position and the direction of the camera head 1001 are changed by a predetermined amount comparing to the image sensing point $A_m$, the next image sensing operation is performed at the next image sensing point $A_{m+1}$. Similarly, images of the object are sensed sequentially at different image sensing points until the camera head 1001 reaches the point $A_n$. While sensing the images of the object as described above, the amount of change in position and direction, obtained from image data as well as posture data from the detector 1004, of the camera head at each image sensing point with respect to the position $A_0$ from which the camera head 1001 sensed the object 1002 for the first time is stored in the memory 1005.

It should be noted that, in a case where the posture detector 1004 detects that at least either the position or the direction of the camera head 1001 is greatly changed while the camera head 1001 moves from $A_0$ toward $A_n$, the apparatus warns the user.

The aforesaid operation is repeated a few times. Then, when enough image data for calculating three-dimensional image data of the object is obtained, this is notified to the user by an indicator which is for notifying the end of the image sensing (not shown) and the image sensing operation is completed.

How the camera head 1001 moves and a method of inputting images are the same as those of the parameter extracting apparatus described in the first embodiment.

Next, the 3D image processor 1006 calculates to generate three-dimensional image data on the basis of the image data and the posture information (posture and position of the camera head 1001 when sensing images) corresponding to each image data stored in the memory 1005.

The 2D image processor 1007 calculates to obtain two-dimensional data of an image of the object seen from the image sensing point ($A_0$) from which the object is first sensed on the basis of the three-dimensional image data obtained by the 3D image processor 1006, and the monitor 1008 displays the calculated two-dimensional data. At this time, the 2D image processor 1007 converts the three-dimensional data into the two-dimensional data in an image type (refer to FIG. 16) selected via the operation unit 1101 by the user.

Figure 19:
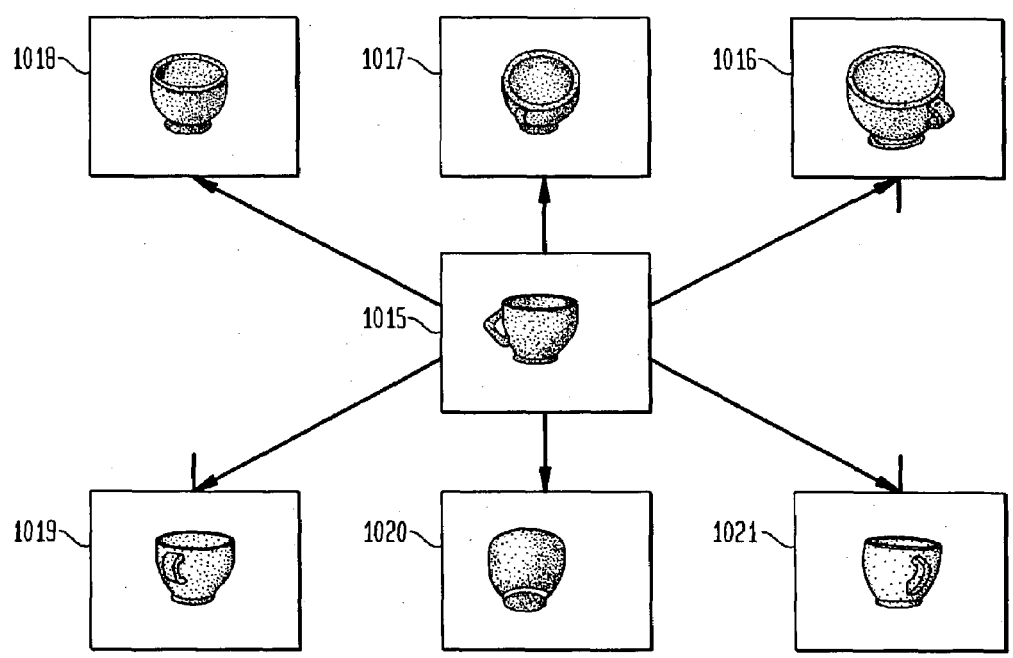
FIG. 19 shows images of an object seen from variety of viewpoints.

Further, the three-dimensional shape extraction apparatus according to the second embodiment is able to change the image of the object displayed on the monitor 1008 to an image of an arbitrary image type designated via the operation unit 1011 by the user or to an image of the object seen from an arbitrary viewpoint. More specifically, when an image type is designated via the operation unit 1011, the 2D image processor 1007 again calculates to obtain two-dimensional image data of a designated image type on the basis of the three-dimensional image data. Further, in order to change viewpoints, an image of the object 1015, as shown in FIG. 19 for example, displayed on the monitor 1008 can be changed to any image of the object seen from an arbitrary viewpoint, as images denoted by 1016 to 1021 in FIG. 19.

The user can designate to output the image data of the sensed object to the printer 1009 after changing viewpoints or image types of the image data according to purpose of using the image. Further, the user can also combine or edit document data, made in advance, and image data, generated by the 2D image processor 1007, while displaying those data on the monitor 1008. If the user wants to change image types and/or viewpoints of the image of the object in this combining/editing process, the user operates the operation unit 1011.

Determination of Image Sensing Parameters

Figure 20:
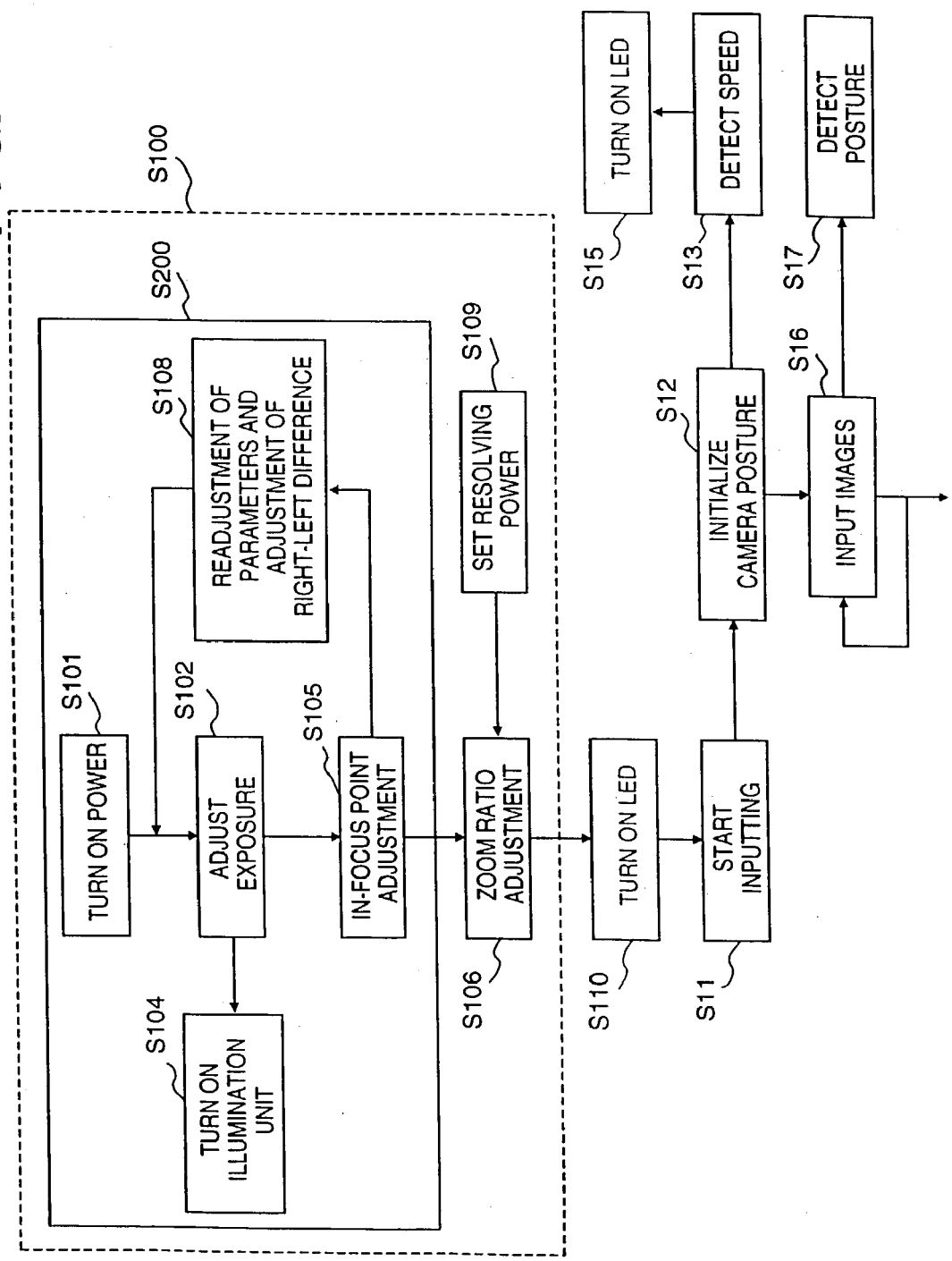
FIG. 20 is a diagram showing a flow of control by the apparatus according to the second embodiment.

A flowchart shown in FIG. 20 shows a processing sequence of the camera portion of the three-dimensional shape extraction apparatus according to the second embodiment.

In FIG. 20, steps S101, S102, S104, S105, S106, S108 and S109 are the same as the steps S1, S2, S4, S5, S6, S8 and S9 described in the first embodiment, respectively.

Briefly, "exposure adjustment" at step S102 is for controlling image signals so that luminance level of the image signals is high enough for performing three-dimensional shape information extraction.

"In-focus point adjustment" at step S105 is for controlling the aperture number (i.e., aperture diaphragm) of the camera so that an image of the object is within the depth of focus by adopting the same method explained with reference to FIG. 6 in the first embodiment.

Further, "zoom ratio adjustment" at step S106 is for adjusting the zoom ratio so that an image of the entire object falls within the image sensing area of each image sensing system, as described with reference to FIGS. 7A and 7B in the first embodiment.

"Readjustment of Parameters and Adjustment of Right-Left Difference" at step S108 includes a correction process performed in a case where the focal length f is changed as a result of the "zoom ratio adjustment" and the depth of focus is changed more than an allowed value as a result of the zoom ratio adjustment, and a process to correct differences between the right and left lenses, as in the first embodiment.

"Setting of Resolving Power" at step S109 has the same purpose as step S9 in the first embodiment.

After the image sensing condition parameters are adjusted by the processes at steps S100 and S200 in FIG. 20, the system controller 1210 gives a signal to an electrical view finder (EVF) 1240 to notify the user of the end of setting the image sensing condition parameters. The EVF 1240 may be a CRT, an LCD, or a simple display, such as an LED. Further, sound may be used along with the display.

Finder Λ When Inputting a Three-dimensional Image

An operator checks the display, e.g., an LED, then starts extracting three-dimensional shape information.

When the operator presses an input start button (not shown), a detection signal by the posture detector 201 is initialized.

As described above, the image processing apparatus in the second embodiment can generate a three-dimensional image and a panoramic image. A three-dimensional image can be generated from more than one image sensed by a double-lens camera (e.g., by the image sensing head 1001 shown in FIG. 15) or sensed by a single-lens camera at more than one image sensing point. In either case, an overlapping portion between an image for the right eye and an image for the left eye of the user is necessary in order to observe the images of the object as a three-dimensional image.

In order to sense an object by using a multi-lens camera (or sense from a plurality of image sensing points), conventionally, it is necessary to provide two view finders. Then, framing is performed by matching images of the object displayed on the two view finders. In the second embodiment, it becomes possible to perform framing the images of the object with a single view finder. For this sake, a finder part (EVF 1240) of the image sensing head 1001 is devised so that the overlapping portion can be easily detected.

Figure 21:
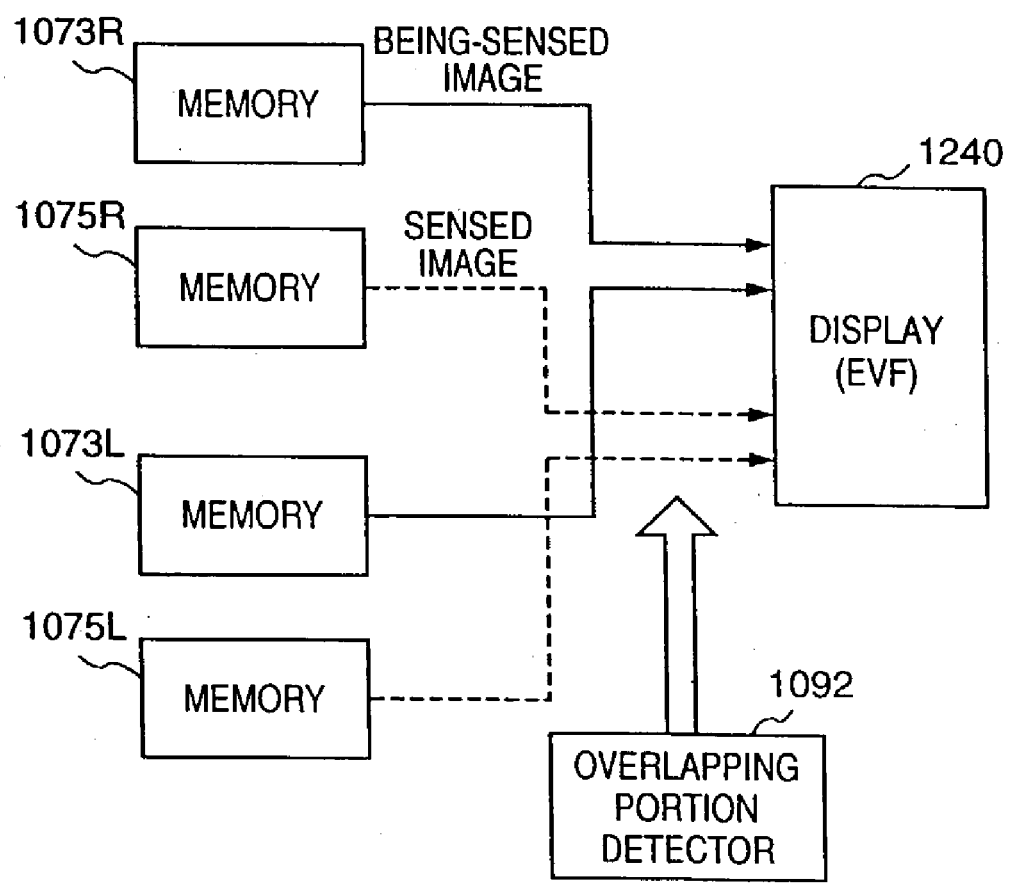
FIG. 21 is an explanatory view for explaining a principle of detecting an overlapping portion according to the second embodiment.

Referring to FIGS. 17 and 21, an operation of the finder according to the second embodiment will be described.

As shown in FIG. 21, the display operation on the finder in the second embodiment is performed with image memories 1073R, 1073L, 1075R and 1075L, the EVF 1240, an overlapping portion detector 1092 and an sound generator 1097 which are shown in FIGS. 17A, 17B.

In a case of sensing the object from a plurality of image sensing points and obtaining three-dimensional shape information on the basis of the sensed images, the sensed images are stored in a recorder 1250 as images relating to each other. The image memories 1073R, 1073L, 1075R and 1075L are used for primary storage of the sensed images. Especially, the last sensed images are stored in the image memories 1075R and 1075L, and the images currently being sensed are stored in the memories 1073R and 1073L.

In a case where the three-dimensional image input mode is selected, the image of the object currently being sensed by the right optical system is stored in the memory 1073R, and the image currently being sensed by the left optical system is stored in the memory 1073L.

The overlapping portion detector 1092 detects an overlapping portion between the image, sensed by the right optical system and stored in the memory 1073R, and the image, sensed by the left optical system and stored in the memory 1073L. A template mapping which will be explained later, for example, may be used for detecting an overlapping portion.

The electronic view finder in the second embodiment has a characteristic in the way of displaying images.

Figure 22:
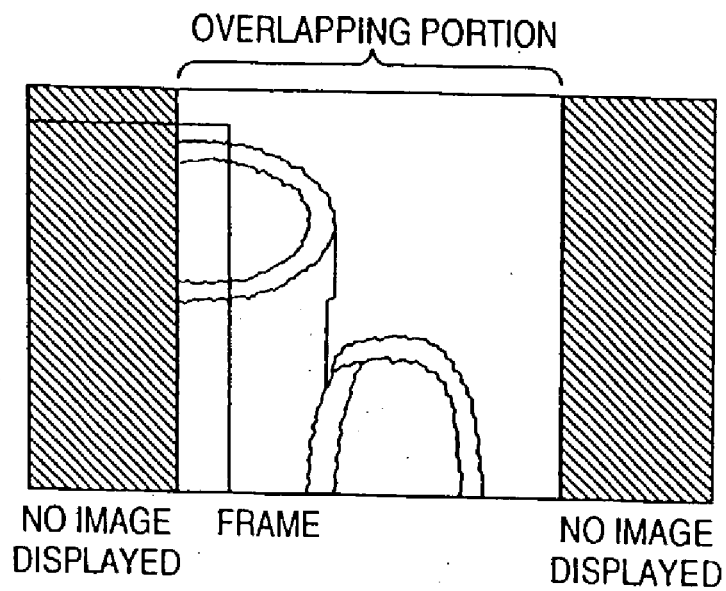
FIG. 22 is an example of an image displayed on a finder according to the second embodiment.

As shown in FIG. 22, no image is displayed on the EVF 1240 for areas which are not overlapped between the right and left images, and an overlapped portion of the images is displayed on the EVF based on the image sensed by the right optical system. An example shown in FIG. 22 shows what is displayed on the EVF 1240 when an object, in this case, a cup, is sensed by the right and left lenses 1100R and 1100L. In FIG. 22, portions indicated by oblique hatching are non-overlapping portions between the right and left images, thus neither right nor left image is not displayed. Whereas, the central area, where a part of the cup is displayed, of the EVF shows the overlapping portion, and a right image is displayed to show that there is the overlapping portion between the right and left images.

A user can obtain a three-dimensional image with no fail by confirming that an object (either partial or whole) which the user wants to three-dimensionally display is displayed on the EVF 1240.

It should be noted that, when the user presses the release button 1230 after confirming the image displayed on the EVF 1240, two images, i.e., the right image and the left image, are sensed at one image sensing point, and overlapping portions of the right and left images are compressed by using JPEG, which is a compressing method, for example, and recorded. The reason for storing only the overlapping portions is to avoid storing useless information, i.e., the non-overlapping portions, since a three-dimensional image of the overlapping portion can be obtained.

Note, in a case where the release button 1230 is pressed when there is no overlapping portion in the angles of views of the right and left image sensing systems, the sound generator 1097 generates an alarm notifying that there is no correlation between the right image and the left image. The user may notice that there is no correlation between the right image and the left image, however, when the user determines it is okay, the image sensing process can be continued by further pressing the release button 1230.

After a plurality of images of the object are sensed at a plurality of image sensing points without any miss-operation, the recorder 1250 is disconnected from the image sensing apparatus and connected to a personal computer. Thereby, it is possible to use the obtained information with an application software on the personal computer.

In order to use the information on a computer, an image is automatically selected by checking a grouping flags included in supplementary information of the images and displayed on the personal computer, thereby using the right and left images.

Figures 23, 24:
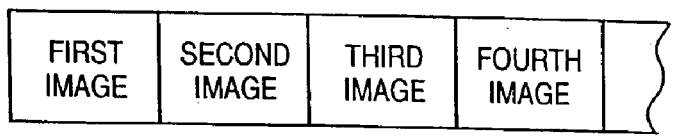
FIG. 23 is an table showing a form of recording three-dimensional images on a recorder according to the second embodiment.
FIG. 24 shows an operation in a panoramic image sensing according to the second embodiment.

A recording format of an image in the recorder 1250 in the three-dimensional image input mode is shown in FIG. 23. More specifically, posture information, image sensing condition parameters, an overlapping portion in a right image and an overlapping portion in a left image are stored for each image sensing point.

In the image files stored in the recorder 1250, group identifier/image sensing point/distinction of right and left cameras/compression method are also recorded as supplementary information.

Panoramic Image Sensing

A panoramic image sensing is a function to synthesize a plurality of images sensed at a plurality of image sensing points as shown in FIG. 24, and more specifically, a function to generate an image as if it is a single continuous image with no overlapping portion and no discrete portion.

Figure 25:
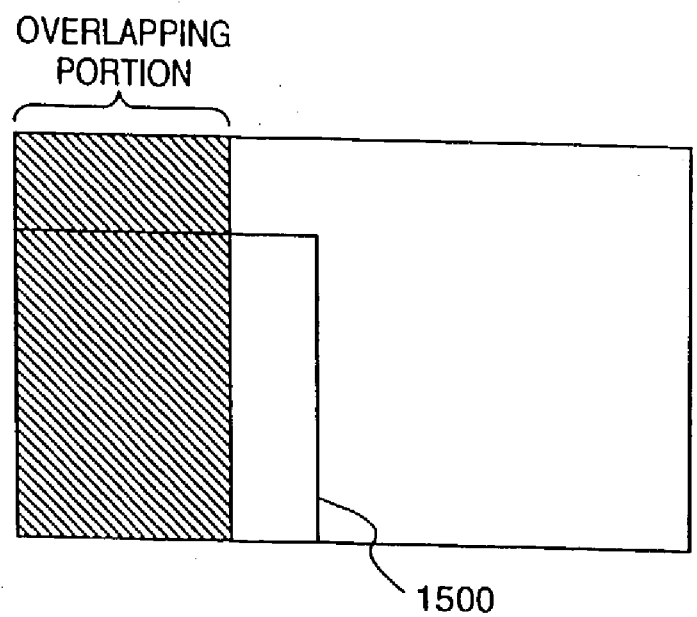
FIG. 25 shows an operation in a panoramic image sensing according to the second embodiment.

In the second embodiment, the image processing apparatus has the overlapping portion detector 1092 for detecting an overlapping portion. Thus, in the panoramic image sensing mode, the system controller 1210 stores images, sensed at a current image sensing point $A_m$ and transmitted from the image signal processors 1104R and 1104L, in the memories 1073R and 1073L, and controls so that the image sensed at the last image sensing point $A_{m-1}$ are read out from the recorder 1250 and stored in the memories 1075R and 1075L. Further, The system controller 1210 controls the overlapping portion detector 1092 to detect an overlapping portion between the image sensed at a current image sensing point $A_m$ and stored in the memory 1073R and the image sensed at the last image sensing point $A_{m-1}$ stored in the memory 1075R. The system controller 1210 further controls the image processor 1220 so that the overlapping portion in the image stored in the memory 1073R (i.e., the image currently being sensed) is not displayed. Then, the overlapping portion is not displayed on the EVF 1240 as shown in FIG. 25. While checking the image displayed on the EVF 1240, the user moves the image sensing head 1001 so that the overlapping portion (i.e., the portion which is not displayed) disappears, thereafter presses the release button 1230.

In the panoramic image sensing mode in the second embodiment, as described above, it is possible to obtain a panoramic image with no fail. Note, in FIG. 25, a frame 1500 shows a field of view seen at the last image sensing-point $A_{m-1}$. The user can obtain a panoramic image more certainly by giving attention to the frame 1500.

Further, in the panoramic image sensing mode, a series of obtained images are stored in the recorder 1250 with supplementary information, as in the case of the three-dimensional image input mode.

According to the three-dimensional image input mode and the panoramic image sensing mode in the second embodiment as described above, image sensing failure can be prevented by displaying an image on the EVF 1240 so that an overlapping portion can be easily seen.

Furthermore, in a case where an image sensing operation is continued when there is no overlapping portion in the three-dimensional image input mode, or in a case where an image sensing operation is continued when there is an overlapping portion in the panoramic image sensing mode, alarm sound is generated, thereby further preventing failure of image sensing operation.

Further, in a case where image sensing operations are made to be related to each other as a group, the grouping information is also recorded as supplementary information of the recorded image, thus it makes it easier to operate on a personal computer.

Further, in a three-dimensional image sensing mode, since only the overlapping portion between the right and left image is displayed on the EVF, a user can clearly see an image which can be three-dimensionally observed. Furthermore, only the overlapping portion between the right and left images is recorded, it is possible to prevent a waste of memory.

As other example of the second embodiment, an overlapping portion between the right and left images may be obtained on the basis of parameters for the image sensing apparatus, such as the focal lengths, distance to the object from the image sensing apparatus, the base line length, and the convergence angle of the right and left image sensing systems instead of finding it by correlation between the right and left images. Then, an image of the obtained overlapping portion is displayed. With this method, although precision may drop somewhat comparing to obtaining the overlapping portion with correlation between the right and left images, image memories can be saved, thus reducing manufacturing cost.

Extraction of Three-Dimensional Information

Next, extraction of three-dimensional information according to the second embodiment will be described.

First, extraction of information on distances to a plurality of points on the object (referred by "distance image information", hereinafter) on the basis of three-dimensional images obtained at a single image sensing point will be described. A processing sequence of extracting distance image information from three-dimensional images is shown in FIG. 26.

Figure 26:
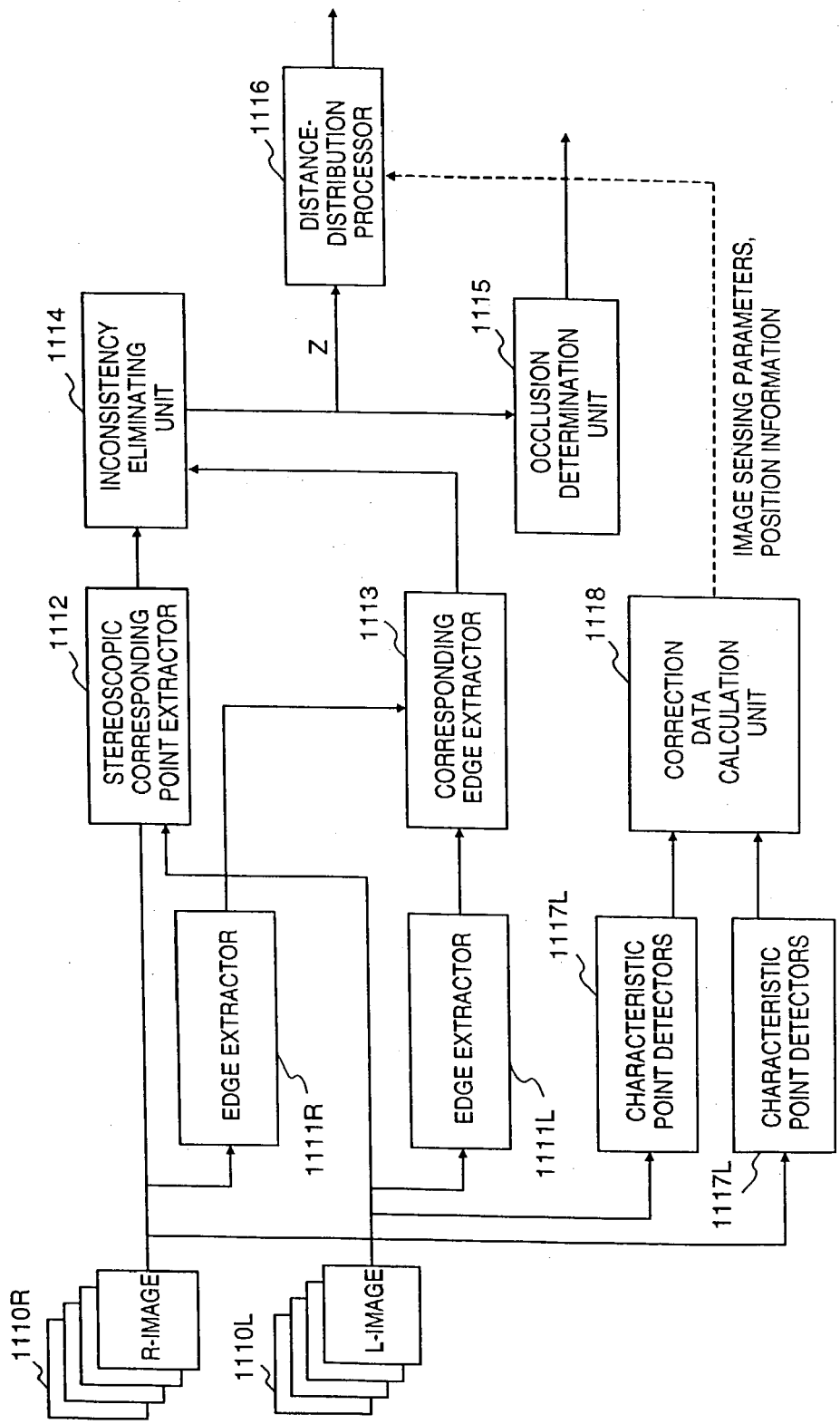
FIG. 26 shows a brief flow for calculating distance information from stereo images according to the second embodiment.

In FIG. 26, right images (R-images) 1110R and left images (L-images) 1110L are three-dimensional images stored in the memory 1910 (shown in FIG. 18). Reference numerals 1111R and 1111L denote edge extractors which detects edges from the stereo images 1110R and 1110L.

A corresponding edge extractor 1113 finds which edge corresponds to which edge in the stereo images 1110R and 1110L. In other words, it extracts corresponding points which indicate a point on the object. A stereoscopic corresponding point extractor 1112 extracts corresponding points which indicate the same point on the object in the three-dimensional images 1110R and 1110L.

The two correspondence information on the point of the object extracted by the two corresponding point extractors 1112 and 1113 have to be the same. An inconsistency eliminating unit 1114 determines whether or not there is any inconsistency between the correspondence information obtained by corresponding edge extractor 1113 and the correspondence information obtained by the stereoscopic corresponding point extractor 1112. If there is, the obtained information on the corresponding points having inconsistency is removed. Note, the inconsistency eliminating unit 1114 can perform determination while weighing each output from the two corresponding point extractors 1112 and 1113.

An occlusion determination unit 1115 determines whether there is any occlusion relationship found in two sets of corresponding point information on the point of the object or not by using position information on the corresponding point information and an index (e.g., remaining difference information) indicating degree of correlation used for finding the corresponding points. This is for increasing reliability on results of the corresponding point processing performed by the stereoscopic corresponding point extractor 1112 and the corresponding edge extractor 1113. Correlation coefficients or remaining difference, as mentioned above, may be used as the index indicating the degree of the correlation. Very large remaining difference or small correlation coefficients mean low reliability of the corresponding relationship. The corresponding points whose correspondence relationship has low reliability are dealt with as either there is an occlusion relationship between the points or there is no correspondence relationship.

A distance-distribution processor 1116 calculates information on distances to a plurality of points on the object by using the triangulation from the correspondence relationship. The triangulation is as described in relation to the equation (7) in the first embodiment.

Characteristic point detectors 1117R and 1117L confirm identity of characteristic points (e.g., markers) on the background 1003. A correction data calculation unit 1118 finds image sensing parameters (aperture diaphragm, focal length, etc.), a posture and displacement of the image sensing head by utilizing the characteristic points extracted from the background image by the characteristic point detectors 1117R and 1117L.

Next, an operation of the image processing apparatus 1220 will be described in sequence with reference to FIG. 26.

First, a method of extracting corresponding points performed by the corresponding points extractors 1112 and 1113 will be described. In the second embodiment, a template matching method is used as the method of extracting corresponding points.

Figure 27:
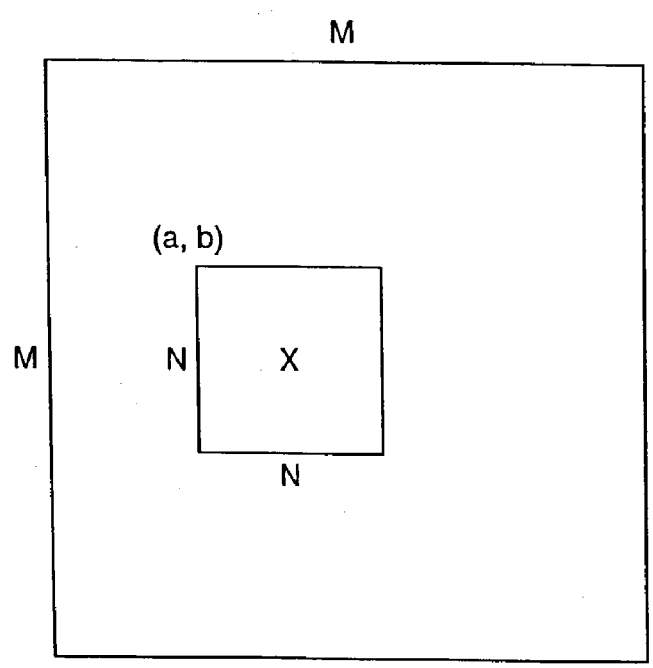
FIG. 27 is an explanatory view for explaining a principle of a template matching according to the second embodiment.

In the template matching method, a block (i.e., template) of N×N pixel size, as shown in FIG. 27, is taken out of either the right image 1110R or the left image 1110L (the right image 1110R is used in the second embodiment), then the block is searched in a searching area of M×M (N<M) pixel size in the other image (the left image 1110L in the second embodiment) for $(M-N+1)^2$ times. In other words, denoting a point (a, b) as the point where the left-uppermost corner of the template, $T_L$, to be set, a remaining difference R(a, b) is calculated in accordance with the following equation, $$R(a, b) = \sum_{i=0}^{N-1} \sum_{j=0}^{N-1} |I_{R(a,b)}(i, j) - T_L(i, j)| \quad (10)$$

The calculation is repeated, while the position (a, b) is moved inside of the image to be searched (the left image in the second embodiment), until a position (a, b) where the remaining difference R(a, b) is minimum is obtained. When the template image $T_L(i, j)$ is at a position (a, b) where the remaining difference R(a, b) is minimum, the central pixel position of the template $T_L(i, j)$ is determined as a corresponding point. Note, in the above equation (10), $I_{R(a,b)}(i, j)$ is an image portion of the right image 1110R when the left-uppermost corner of the template is at a point (a, b).

The stereoscopic corresponding point extractor 1112 applies the aforesaid template matching method on the stereo images 1110R and 1110L as shown in FIG. 26, thus obtaining corresponding points in luminance level.

Extraction of corresponding points on edge is performed by applying the aforesaid template matching to the stereo images which are processed with edge extraction. The edge extraction process (performed by the edge extractors 1111R and 1111L) as a pre-processing for the extraction of corresponding points on edge enhances edge parts by using a Robert filter or a Sobel filter, for example.

More concretely, in a case where the Robert filter is used, the stereo images 1110R and 1110L (referred by f(i,j)) are inputted the edge extractors 1111R and 1111L, then outputted as image data expressed by the following equation (referred by g(i,j)), $$g(i, j) = \quad (11)$$
$$\mathrm{sqrt}(\{f(i, j) - f(i+1, j+1)\}^2) + \mathrm{sqrt}(\{f(i+1, j) - f(i, j+1)\}^2)$$

In a case of using the Robert filter, the following equation may be used instead of the equation (11).

$$g(i, j) = \mathrm{abs}\{f(i, j) - f(i+1, j+1)\} + \mathrm{abs}\{f(i+1, j) - f(i, j+1)\} \quad (12)$$

When using the Sobel filters, an x-direction filter $f_x$ and a y direction filter $f_y$ are defined as below.

$$f_x = \begin{pmatrix} -1 & 0 & 1 \\ -2 & 0 & 2 \\ -1 & 0 & 1 \end{pmatrix} \quad (13)$$

$$f_y = \begin{pmatrix} -1 & 2 & -1 \\ 0 & 0 & 0 \\ 1 & 2 & 1 \end{pmatrix}$$

When the slope of the edge is expressed by θ, then, $$\theta = \tan^{-1}\left(\frac{f_y}{f_x}\right) \quad (14)$$

The edge extractors further applies binarization process on the images whose edges were enhanced to extracts edge portions. The binarization is performed by using an appropriate threshold.

The image processing apparatus 1220 detects information on distances (referred as "distance information", hereinafter) in the distance-distribution processor 1116 (shown in FIG. 26), further combines the distance information in time sequence by following the order of processed points shown in FIG. 28.

Next, a time-sequential combining operation of the distance information by the distance-distribution processor 1116 is explained in more detail with reference to FIG. 28.

The distance-distribution processor 1116 of the image processor 1220 operates distance information Z in accordance with the aforesaid equation (7). Since the image sensing operation is performed at each image sensing point in this case, the distance information $Z^t$ corresponding to image sensing points $(A_0, A_1, \ldots, A_n)$ forms a sequence of time distance information. Thus, the distance information is denoted by $Z^t(i,j)$. If the image sensing operations at image sensing points are performed at an equal time interval δt, for the sake of convenience, the distance information can be expressed with $Z^t(i,j)$, $Z^{t+2\delta t}(i,j)$, $Z^{t+3\delta t}(i,j)$, and so on, as shown in FIG. 28.

To the distance-distribution processor 1116, as shown in FIG. 26, the occlusion information is inputted from the occlusion determination unit 1115, and image sensing parameters and posture information are inputted from the correction data calculation unit 1118.

Figure 28:
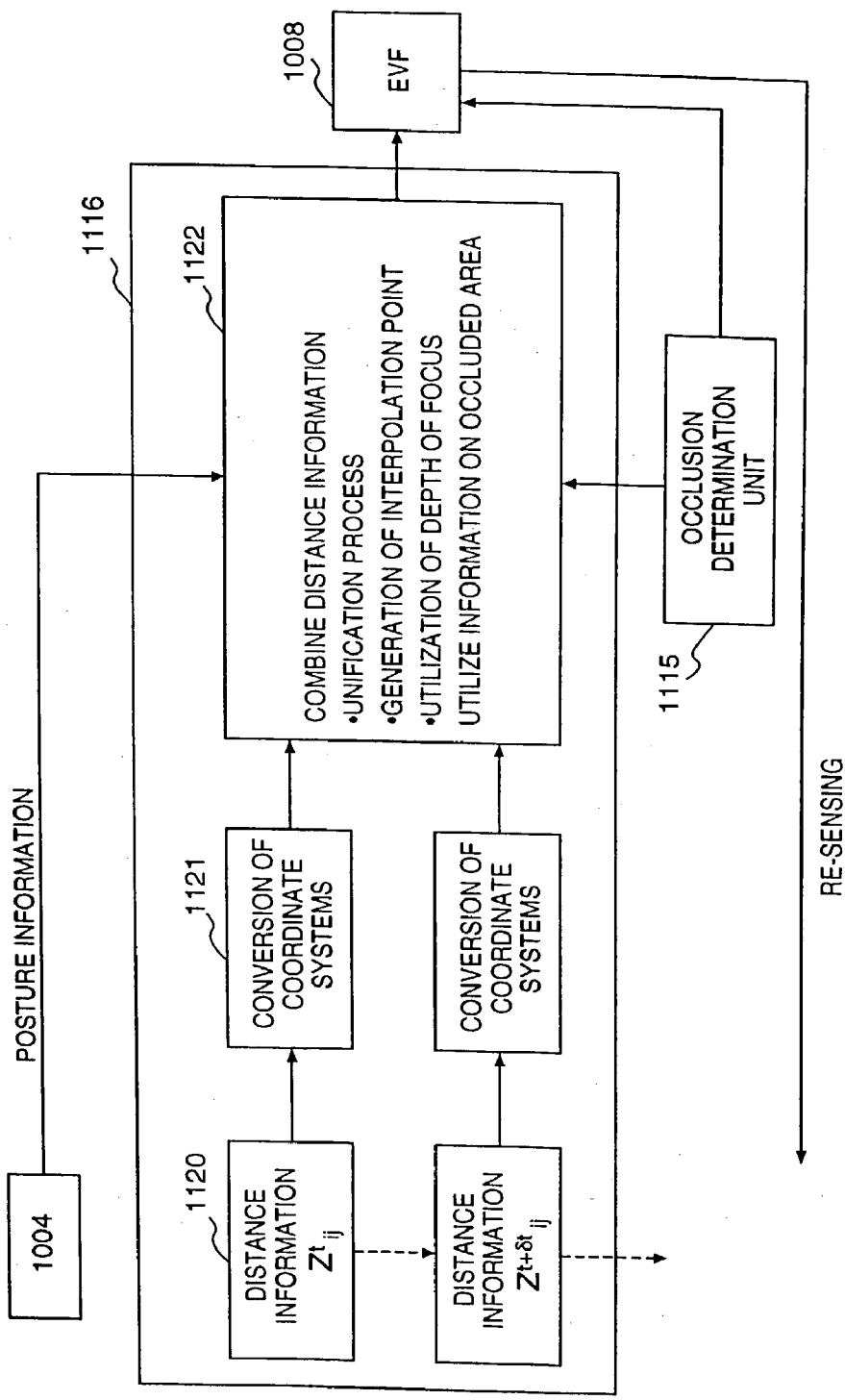
FIG. 28 shows a brief flow for combining the distance information according to the second embodiment.

Referring to FIG. 28, a conversion unit 1121 maps the distance information $Z^t(i,j)$ (1120) to integrated coordinate systems. The distance information which is mapped to the integrated coordinate systems is combined. Here, the word "combine" includes a process of unifying the identical points on images of the object (unification process), an interpolation process of interpolating between coordinates of the obtained points, a determination process of determining reliability of coordinates of points on the basis of flags included in depth-of-focus information of the image sensing system, and selection or removal of distance information on the basis of occlusion detection information.

To combine the distance information always starts from the unification process.

Referring to FIG. 28, the distance information 1120 of the obtained stereo images are generated in every second. Meanwhile, the system controller 1210 sends information, such as a displacement amount direction of the image sensing head 1001, to the processing unit 1116 in synchronization with the distance information. With the sent information, the obtained distance information is mapped to the integrated coordinate systems by applying a processing method which will be explained later. The mapping to the integrated coordinate systems is aimed for making it easier to combine the information which is obtained in every second.

It is assumed that two corresponding points $(x_0, y_0, z_0)$ and $(x_1, y_1, z_1)$ are obtained from an image sensed at time t and an image sensed at time t+δt. The determination whether these two corresponding points are an identical point on an object or not is performed on the basis of the following equation. When a small constant $\epsilon_1$ is defined, if the following relationship, $$(x_0-x_1)^2+(y_0-y_1)^2+(z_0-z_1)^2 \ll \epsilon_1 \qquad (15)$$

is satisfied, then the two points are considered as an identical point, and the either one point is outputted on the monitor 1008.

Note, instead of the equation (15), the equation, $$a(x_0-x_1)^2+b(y_0-y_1)^2+c(z_0-z_1)^2 \ll \epsilon_2 \qquad (16)$$

can be used. In the equation (16), a, b, c and d are some coefficients. By letting a=b=1 and c=2, i.e., putting more weight in the z direction than in the x and y directions, for example, the difference of the distances $Z^t$ in the z direction can be more sensitively detected comparing to the other directions.

Thereby, one of the corresponding points between the images sensed at the image sensing points $(A_0, A_1, \ldots, A_n)$ is determined.

Upon combining the distance information, an interpolation process is performed next.

The interpolation process in the second embodiment is a griding process, i.e., an interpolation process with respect to a pair of corresponding points in images obtained at different image sensing points (viewpoints). Examples of grids (expressed by dashed lines) in the z direction are shown in FIG. 29 as an example.

In FIG. 29, ○ and ● are a pair of extracted corresponding data, and □ is corresponding data obtained after interpolating between ● data and the ○ data on the grid by performing a linear interpolation or a sprain interpolation, for example.

Upon combining the distance information, reliability check is performed.

The reliability check is for checking reliability of coordinates of corresponding points on the basis of information on the depth of focus sent from the image sensing systems. This operation is for removing corresponding point information of low reliability by using the information on the depth of focus of the image sensing systems, as well as for selecting pixels on the basis of the occlusion information.

Upon combining the distance information, mapping to the integrated coordinate systems is performed at last.

Figure 30B:
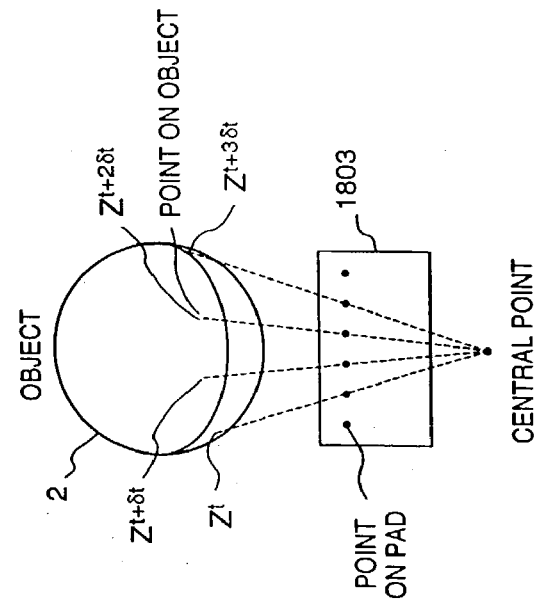
FIGS. 30A and 30B are explanatory view for showing a method of mapping the distance information to integrated coordinate systems according to the second embodiment.
Figure 30A:
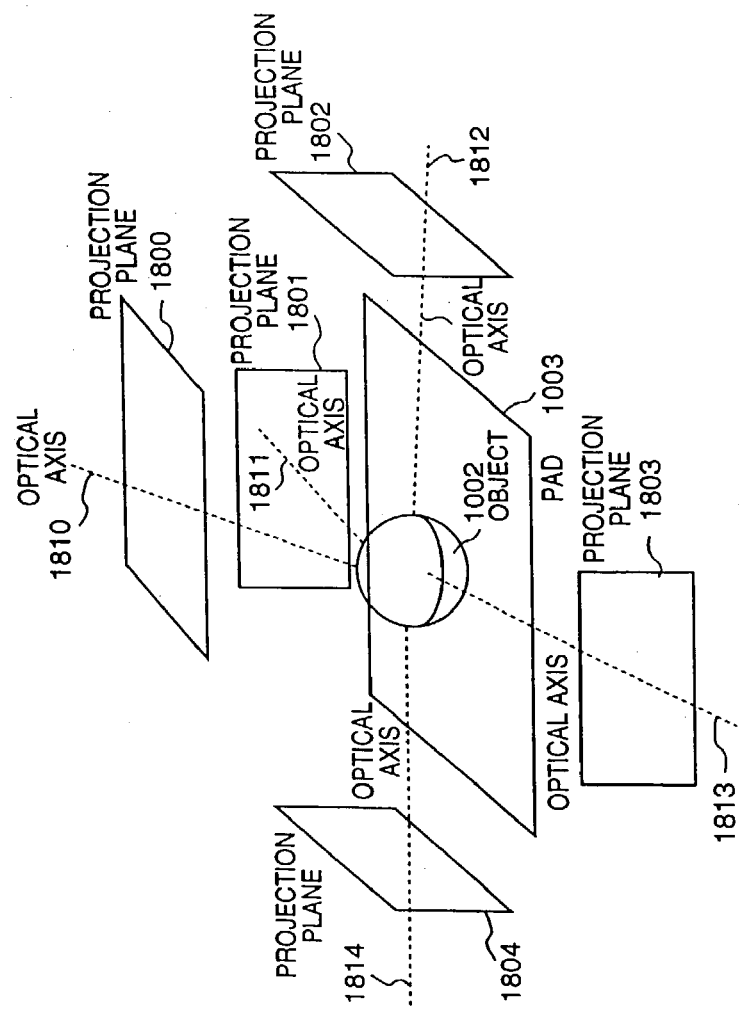

A method of mapping distance information $Z^t$ to the integrated coordinate systems is shown in FIGS. 30A and 30B.

In FIGS. 30A and 30B, reference numeral 1002 denotes an object, and 1003 denotes a pad. The pad 1003 corresponds to a background stage to be serve as a background image.

Reference numerals 1800 to 1804 denote virtual projection planes of optical systems of the image sensing head 1001, and the distance information projected on the projection planes is registered in the second embodiment. Further, reference numerals 1810 to 1814 denotes central axes (optical axes) of the projection planes 1800 to 1804, respectively.

The integrated coordinate systems are five coordinate systems (e.g., xyz coordinate systems) forming the aforesaid five virtual projection planes.

First, the distance information $Z^t_{ij}$ obtained as above is projected on each of the projection planes (five planes). In the projection process, conversion, such as the rotation and shifts, is performed on the distance information $Z^t_{ij}$ along each reference coordinates. As an example, the projection process to the projection plane 1803 is shown in FIG. 30B.

The same process as shown in FIG. 30B is performed for the projection planes other than the projection plane 1803. Further, the same projection process is performed on the next distance information $Z^{t+\delta t}_{ij}$. Then, the distance information is overwritten on each projection plane in time sequence.

As described above, distance information of an object along five base axes can be obtained. More concretely, one point may be expressed by five points, $(x_0, y_0, z_0)$, $(x_1, y_1, z_1)$, $(x_2, Y_2, Z_2)$, $(x_3, y_3, z_3)$ and $(x_4, y_4, z_4)$.

A three-dimensional image is generated as described above.

Correction of Image Sensing Parameters

Image sensing parameters needs to be corrected in response to a posture of the image sensing head 1001 with respect to the background stage 1003. Correction of the parameters is performed by the system controller 1210 with help of the image processor 1220 or the posture detector 1004.

In the second embodiment, there are two modes: one mode is for correcting the image sensing parameters based on information from the posture detector 1004; and the other mode is for performing the correction based on image information from the image processor 1220.

Figure 31:
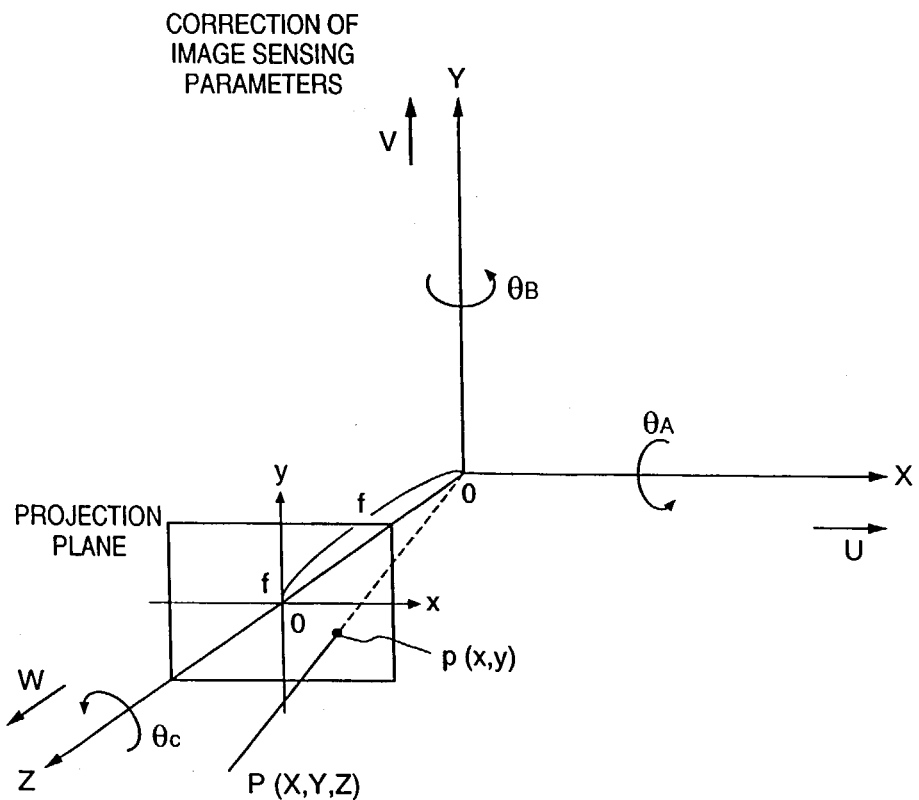
FIG. 31 shows a brief coordinate system of an image sensing system according to the second embodiment.
Figure 32:
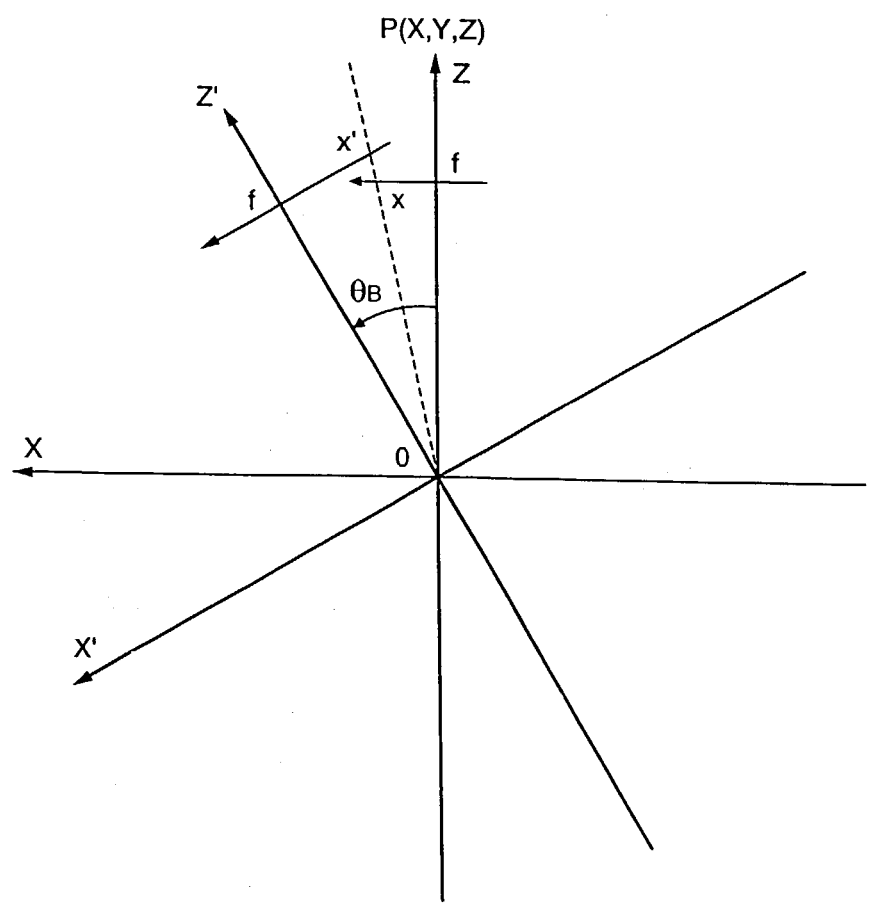
FIG. 32 shows a brief coordinate system when the image sensing system is rotated according to the second embodiment.

First, a method of correcting the image sensing parameters on the basis of the image information from the image processor 1220 will be explained with reference to FIG. 31.

In the second embodiment, a pad is used as a background stage 1003. Assume that the pad 1003 is in an XYZ coordinate system, and a point on the pad 1003 is expressed with (U, V, W) in the XYZ coordinate system. If the point of the pad 1003 rotates by an angle $\theta_A$ about the X axis, by an angle $\theta_B$ about the Y axis, and by an angle $\theta_C$ about the z axis, further slides by (U, V, W) with respect to coordinate systems of each of the image sensing systems, then an arbitrary point on the pad 1003, (X, Y, Z), in the coordinate system of the left image sensing system, $(X_L, Y_L, Z_L)$, is, $$\begin{pmatrix} X_L \\ Y_L \\ Z_L \end{pmatrix} = A_L \cdot B_L \cdot C_L \cdot \begin{pmatrix} X \\ Y \\ Z \end{pmatrix} - \begin{pmatrix} U_L \\ V_L \\ W_L \end{pmatrix} \qquad (17)$$

Further, the arbitrary point on the pad 1003, (X, Y, Z), in the coordinate system of the right image sensing system, $(X_R, Y_R, Z_R)$, is, $$\begin{pmatrix} X_R \\ Y_R \\ Z_R \end{pmatrix} = A_R \cdot B_R \cdot C_R \cdot \begin{pmatrix} X \\ Y \\ Z \end{pmatrix} - \begin{pmatrix} U_R \\ V_R \\ W_R \end{pmatrix} \qquad (18)$$

Note, the $A_L$, $B_L$, $C_L$ in the equation (17) are matrices which represent affine transformation, and they are defined by the following matrices.

$$A_L = \begin{pmatrix} 1 & 0 & 0 \\ 0 & \cos\theta_A & \sin\theta_A \\ 0 & -\sin\theta_A & \cos\theta_A \end{pmatrix} \qquad (19)$$

-continued $$B_L = \begin{pmatrix} \cos\theta_B & 0 & -\sin\theta_B \\ 0 & 1 & 0 \\ \sin\theta_B & 0 & \cos\theta_B \end{pmatrix}$$

$$C_L = \begin{pmatrix} \cos\theta_C & \sin\theta_C & 0 \\ -\sin\theta_C & \cos\theta_C & 0 \\ 0 & 0 & 1 \end{pmatrix}$$

The matrices, $A_R$, $B_R$, $C_R$, in the equation (18) are also defined by the same matrices (19).

For example, in a case where the image sensing head 1001 is at a distance B from the pad 1003 along the X axis (with no rotation), A=B=C=1. Therefore, the following equation can be obtained from equations (17) and (18), $$\begin{pmatrix} X_L \\ Y_L \\ Z_L \end{pmatrix} - \begin{pmatrix} X_R \\ Y_R \\ Z_R \end{pmatrix} = \begin{pmatrix} B \\ 0 \\ 0 \end{pmatrix} \quad (20)$$

Accordingly, in a case where the pad 1003 rotates with respects to the image sensing systems, $$(A_L \cdot B_L \cdot C_L - A_R \cdot B_R \cdot C_R) \cdot \begin{pmatrix} X_L \\ Y_L \\ Z_R \end{pmatrix} - \begin{pmatrix} X_R \\ Y_R \\ Z_R \end{pmatrix} = \begin{pmatrix} B \\ 0 \\ 0 \end{pmatrix} \quad (21)$$

is obtained.

Now, assume that coordinates of corresponding points of an arbitrary point $P_0(x, y, z)$ of the object in the right and left image sensing systems have been extracted by the characteristic point extraction process and the corresponding point in an image sensed with the left image sensing system is expressed by $p_\lambda(x_\lambda, y_\lambda)$ and the corresponding point in an image sensed with the right image sensing system is expressed by $p_r(x_r, y_r)$. Then, the position of the corresponding points, (u, v), in a coordinate system of the CCD of the image sensing head 1001 is, $$(u, v) = (x_l, y_l) - (x_r, y_r) \quad (22)$$

where, $$(x_l, y_l) = f \cdot \left( \frac{X_L}{Y_L}, \frac{Y_L}{Z_L} \right) \quad (23)$$

$$(x_r, y_r) = f \cdot \left( \frac{X_R}{Y_R}, \frac{Y_R}{Z_R} \right) \quad (24)$$

thus, $$(u, v) = f \cdot \left( \frac{X_L}{Y_L}, \frac{Y_L}{Z_L} \right) - f \cdot \left( \frac{X_R}{Y_R}, \frac{Y_R}{Z_R} \right) \quad (25)$$

For example, if there is no convergence angle between multiple image sensing systems (1100R and 1100L), then, $A_L = B_L = C_L = E$ (identity matrix)
$A_R = B_R = C_R = E$ (identity matrix)
U=B, V=W=0, and the equation (20) holds, therefore, $$(u, v) = \left( \frac{f}{Z_L} \right) \cdot (B, 0) \quad (26)$$

Thus, the coordinates of the arbitrary point on the pad 1003 in the Z direction becomes, $$Z_L = Z_R = f \cdot \left( \frac{B}{u} \right) \quad (27)$$

With the equations as described above, the relationship between the pad and the image sensing systems are defined.

The aforesaid is just a brief explanation of correcting image sensing parameters, however, the generality of the method is fully explained. Further, the details of this method is explained in the Japanese Patent Application Laid-Open No. 6-195446 by the same applicant of the present invention.

Further, in a case where correcting the image sensing parameters on the basis of outputs from sensors is applied, it is preferred to use the average of the outputs from the image processing units and the outputs from the sensors.

As other choice of the method, it may be possible to shorten processing time required for image processing by using the outputs from the sensors as initial values.

Editing a Three-dimensional Image

Next, a combining process of stereoscopic information, image texture and a document file, and an output process will be explained.

Figure 33:
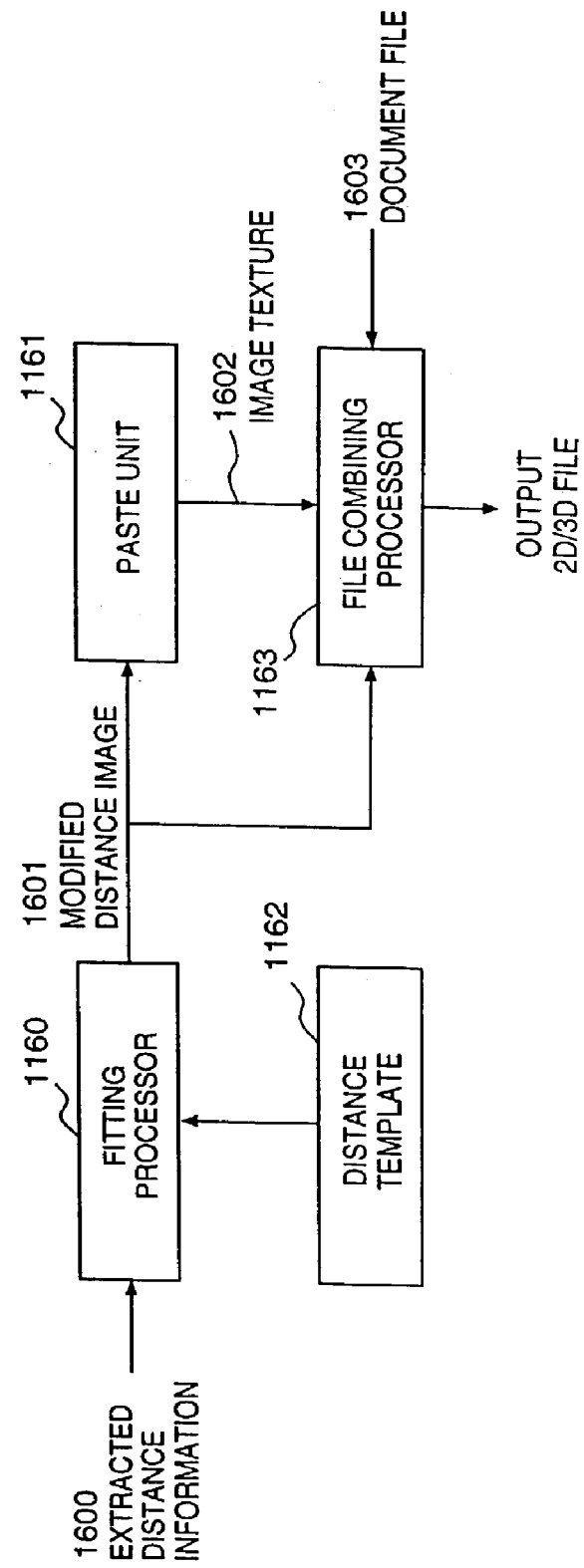
FIG. 33 shows a brief flow of combining a document file, image information and the distance information according to the second embodiment.

FIG. 33 shows a processing sequence of combining the stereoscopic information which is obtained as described above, the image texture, and the document file. Each process shown in FIG. 33 is performed by the image processor 1220.

The extracted distance information ($Z^r$) is obtained through image sensing operations with a camera, thus, it often represents a shape different from a real object. Or, there are cases in which the distance information is not preferred because it represents the same shape as the real object. Referring to FIG. 33, a fitting processor 1160 corrects the extracted distance information ($Z^r$) 1600 by using a distance template 1162 in response to a user operation.

A paste unit 1161 pastes image texture 1602 to distance information which is corrected by the fitting process.

A file combining processor 1163 integrates the corrected distance information 1601, the image texture 1602 and a document file 1603 to generate a single file. The document file 1603 is a document text inputted from the operation unit 1101. The combined file is outputted as a two- or three-dimensional image.

First, a fitting process is explained.

Figure 34:
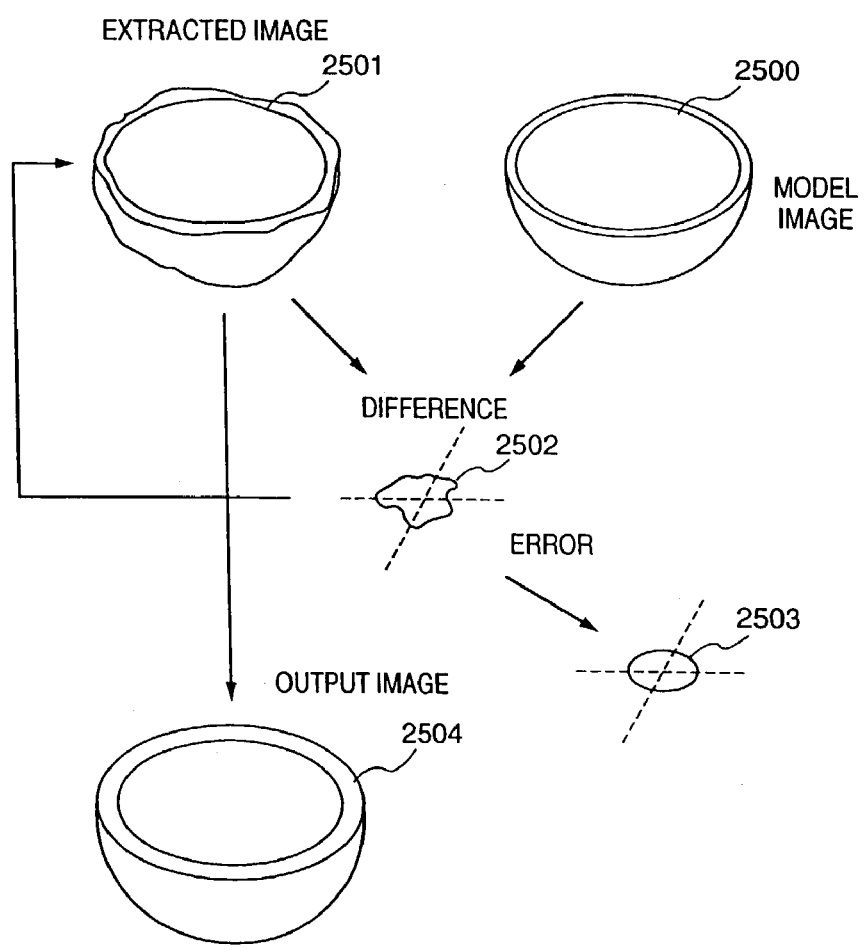
FIG. 34 is an explanatory view showing a flow that image information is fitted to a model image according to the second embodiment.

A flow of the fitting process is shown in FIG. 34. In FIG. 34, reference numeral 2501 denotes an image represented by the extracted distance information; 2500, a model image to be a template; and 2502 and 2503, differences between the extracted image 2501 and the model image 2500.

The fitting processor 1160 first displays the aforesaid two images (2500 and 2501) on the monitor 1008 as shown in FIG. 34 and prompts a user to perform a fitting operation. If a user designates to perform the fitting process with the model image 2500, then the fitting processor 1160 calculates the difference 2502 between the two images, then corrects an image based on the differences 2502 into an image of the uniform differences 2503. Further, the image 2501 is corrected on the basis of the image of the difference 2503 into an image 2504. Note, the correction can be performed by using an input pen.

As described above, a process of pasting the texture image 1602 to the corrected distance information 1601 obtained by performing the fitting process is the same as a method which is used in a field of computer graphics, and the like.

Thereafter, the pasted image is further combined with the document file to generate a file for a presentation, for example.

Figure 35:
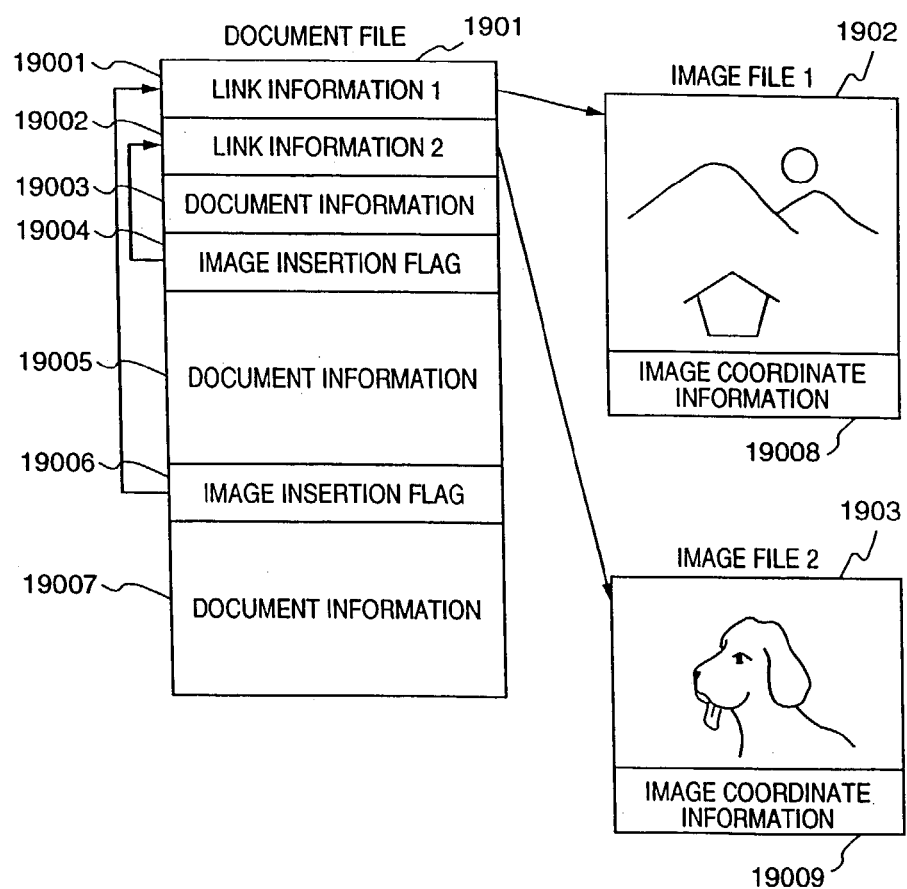
FIG. 35 is an explanatory view showing that an image information file is combined with the document file according to the second embodiment.

FIG. 35 shows a method of combining an image and a document by the file combining processor 1163. In this method, information on an area in a document 1901 where an image is to be imbedded is stored in an image coordinate information field. In an example shown in FIG. 35, the image file 1902 is pasted at a coordinate position stored in a field 19008, and an image file 1903 is pasted at a coordinate position stored in a field 19009.

Fields 19001 and 19002 in the document file 1901 contain link information and respectively indicate connection relationship between the document file 1901 and each of the image files 1902 and 1903. Further, fields 19003, 19005 and 19007 are for document data. Fields 19004 and 19006 are for image insertion flags which indicate where images are to be inputted, and indicate to refer to link information, in the fields 19001 and 19002, showing links to the image files.

The document file is made with link information, image insertion flag and document data. The image file is embedded in the position of the image embedding flag. Since the image file includes image coordinate information, an image is converted into an image seen from an arbitrary viewpoint on the basis of the image coordinate information and embedded in practice. In other words, the image coordinate information is information showing conversion relationship with respect to an originally obtained image. The image file thus generated is finally used.

<First Modification of the Second Embodiment>

Next, a modification of the second embodiment will be explained.

Figure 36:
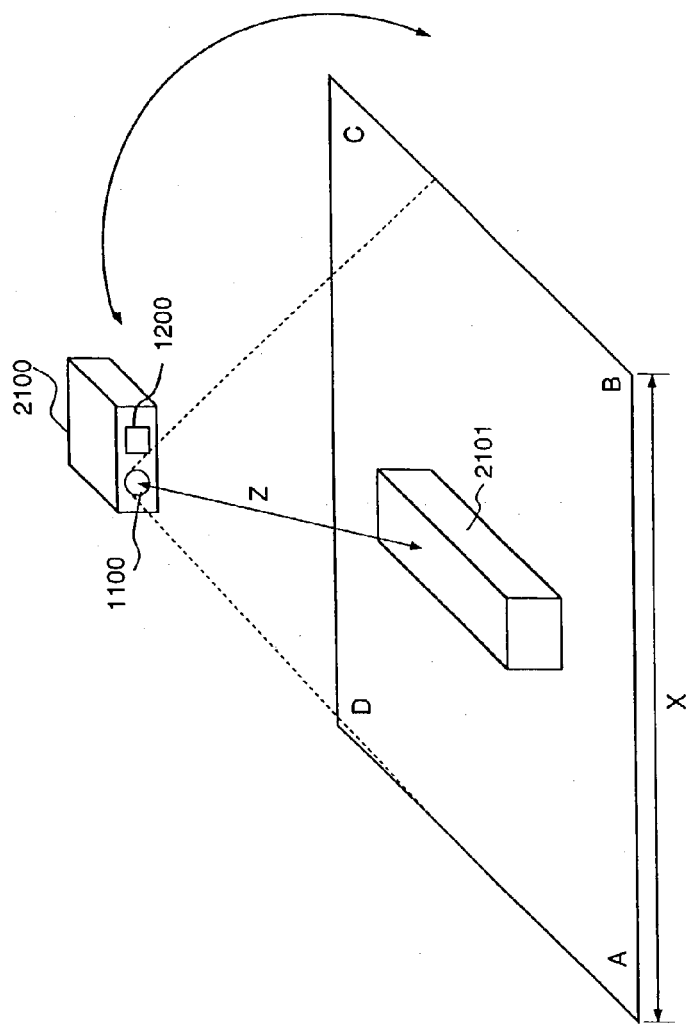
FIG. 36 is a brief overall view of an image processing system according to a first modification of the second embodiment.

FIG. 36 is a brief overall view of an image processing system according to a first modification of the second embodiment. In the first modification, the three-dimensional shape extraction apparatus of the three-dimensional image editing system of the second embodiment is changed, and this modification corresponds to the first modification of the first embodiment.

In FIG. 36, an object 2101 is illuminated by the illumination unit 1200, and the three-dimensional shape information is extracted by a three-dimensional shape extraction apparatus 2100.

Further, reference numeral 2102 denotes a calibration pad and the three-dimensional shape extraction apparatus 2100 detects the posture of itself on the basis of an image of the pad 2102.

Note, characters, A, B, C and D written on the pad 2102 are markers used for detection of the posture. The posture is calculated from the direction and distortion of these markers.

Figure 37:
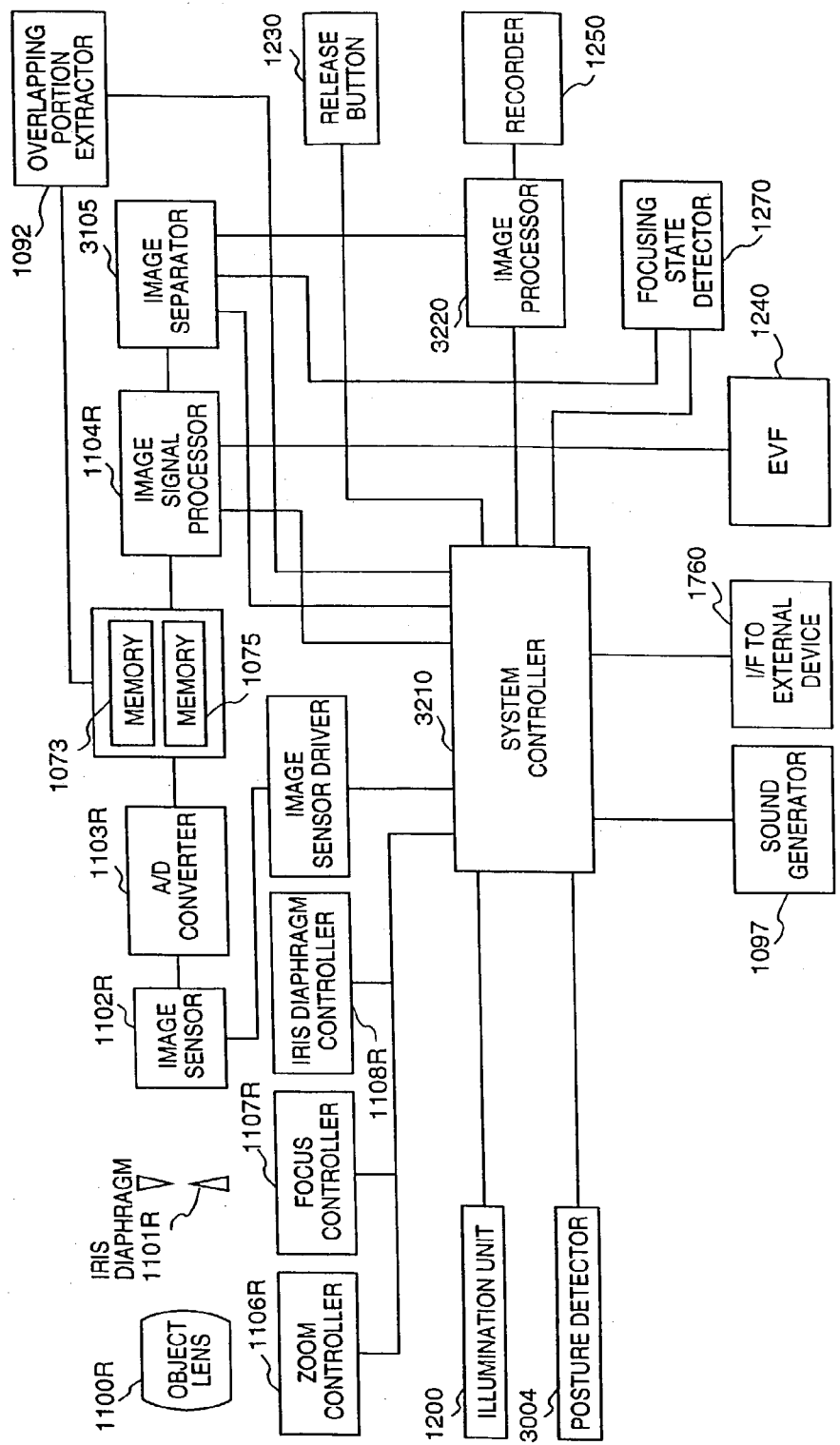
FIG. 37 is a block diagram illustrating a configuration of a three-dimensional shape extraction apparatus 2100 according to the first modification of the second embodiment.

FIG. 37 is a block diagram illustrating a configuration of the three-dimensional shape extraction apparatus 2100 according to the first modification of the second embodiment. In FIG. 37, the units and elements which have the same reference numerals as those in FIGS. 17A, 17B have the same function and operation, thus explanation of them is omitted.

A posture detector 3004 is for detecting the posture of the three-dimensional shape extraction apparatus 2100 on the basis of the direction, distortion, and so on, of the markers written on the pad 2102. Reference numeral 3220 denotes an image processor which extracts three-dimensional shape information of the object from image signals and posture information from the posture detector 3004. Reference numeral 3210 denotes a system controller which controls the overall operation of the three-dimensional shape extraction apparatus 2100.

Figure 38:
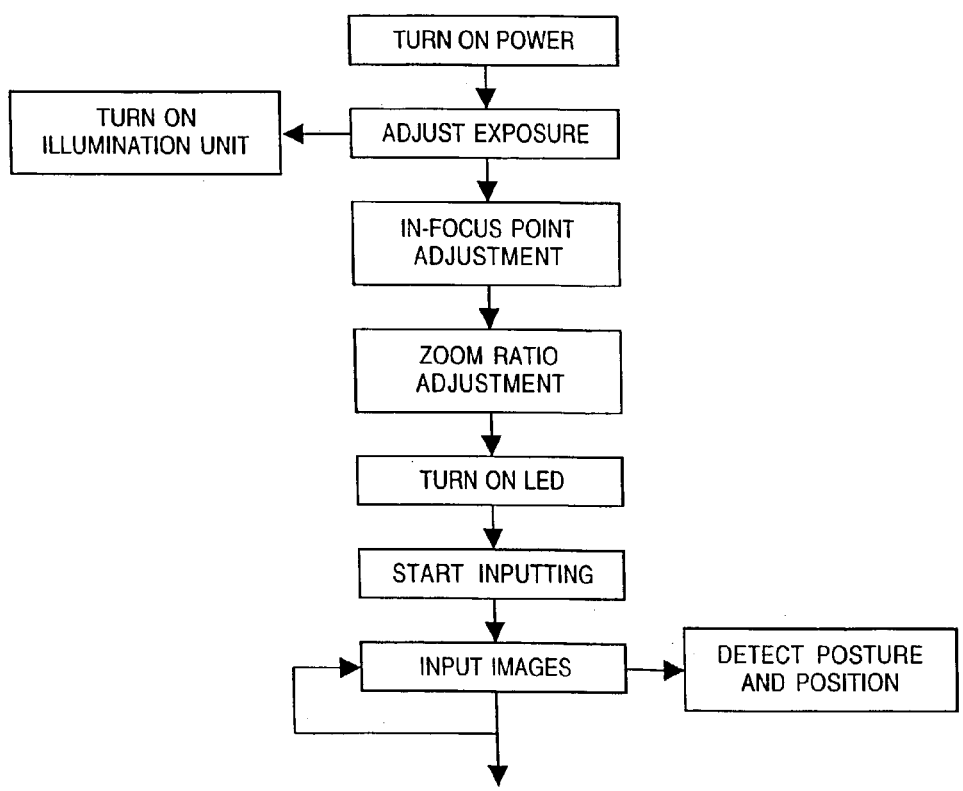
FIG. 38 is a flowchart showing a processing by the three-dimensional shape extraction apparatus according to the first modification of the second embodiment.

Operation of the three-dimensional shape extraction apparatus according to the first modification of the second embodiment will be explained next. FIG. 38 is a flowchart showing a processing sequence by the three-dimensional shape extraction apparatus 2100 according to the first modification of the second embodiment. The first modification differs from the second embodiment in a method of adjusting the zoom ratio. The apparatus of the first modification performs posture detection in accordance with characteristic points (i.e., markers) of the pad 2102, thus an image of pad 2102 is necessarily sensed in an appropriate area of the field of view of the image sensing system in an image sensing operation.

Therefore, an image separator 3105 performs correlation operation or a template matching process between characteristic information (inputted in advance) of the markers (letters, A, B, C and D) on the pad 2102 and image signals which are currently being inputted, and detects the positions of the markers. Thereafter, a result of the detection is outputted to the system controller 3210. The system controller 3210 sets the focal length of the image sensing system on the basis of the detected positions of the markers so that the pad 2102 is sensed in an appropriate range of the field of view of the image sensing system. At the same time, information on the focal length which makes the field of view of the image sensing system to includes the entire pad 2102 is stored in a memory (not shown) in the system controller 3210. Thereby, it is possible to always sense the entire pad in the field of view of the image sensing system, as well as to detect the posture of the three-dimensional shape extraction apparatus 2100 on the basis of distortion of the image of the markers.

As shown in FIG. 38, when parameters for the image sensing system are set, then an LED of the EVF 1240 is turned on to notify a user that the apparatus 2100 is ready for input.

In turn of this notification, the user starts inputting, and presses the release button 1230 at a predetermined interval while moving the apparatus 2100, thus inputs images. At this time, the system controller 3210 sets the focal length so that the markers on the pad 2102 with the object are always within an appropriate range of the field of view of the image sensing system on the basis of information from the image separator 3105. Furthermore, information on the image sensing parameters, including the focal length at each image sensing point, is stored in the memory 1910. Accordingly, the posture detector 3004 detects the posture of the apparatus 2100 from the states of the markers.

The image processor 3220 reads out a plurality of image signals stored in the image memories 1073 and 1075, then converts the image into an image of a single focal length on the basis of the information on the image sensing parameters stored in the memory in the system controller 3210. Further, the image processor 3220 extracts three-dimensional shape information of the object from the corrected image signals and the posture signal obtained by the posture detector 3004, then outputs the information to the recorder 1250. The recorder 1250 converts the inputted signals into signals of a proper format, then records them on a recording medium.

<Second Modification of the Second Embodiment>

Figure 39:
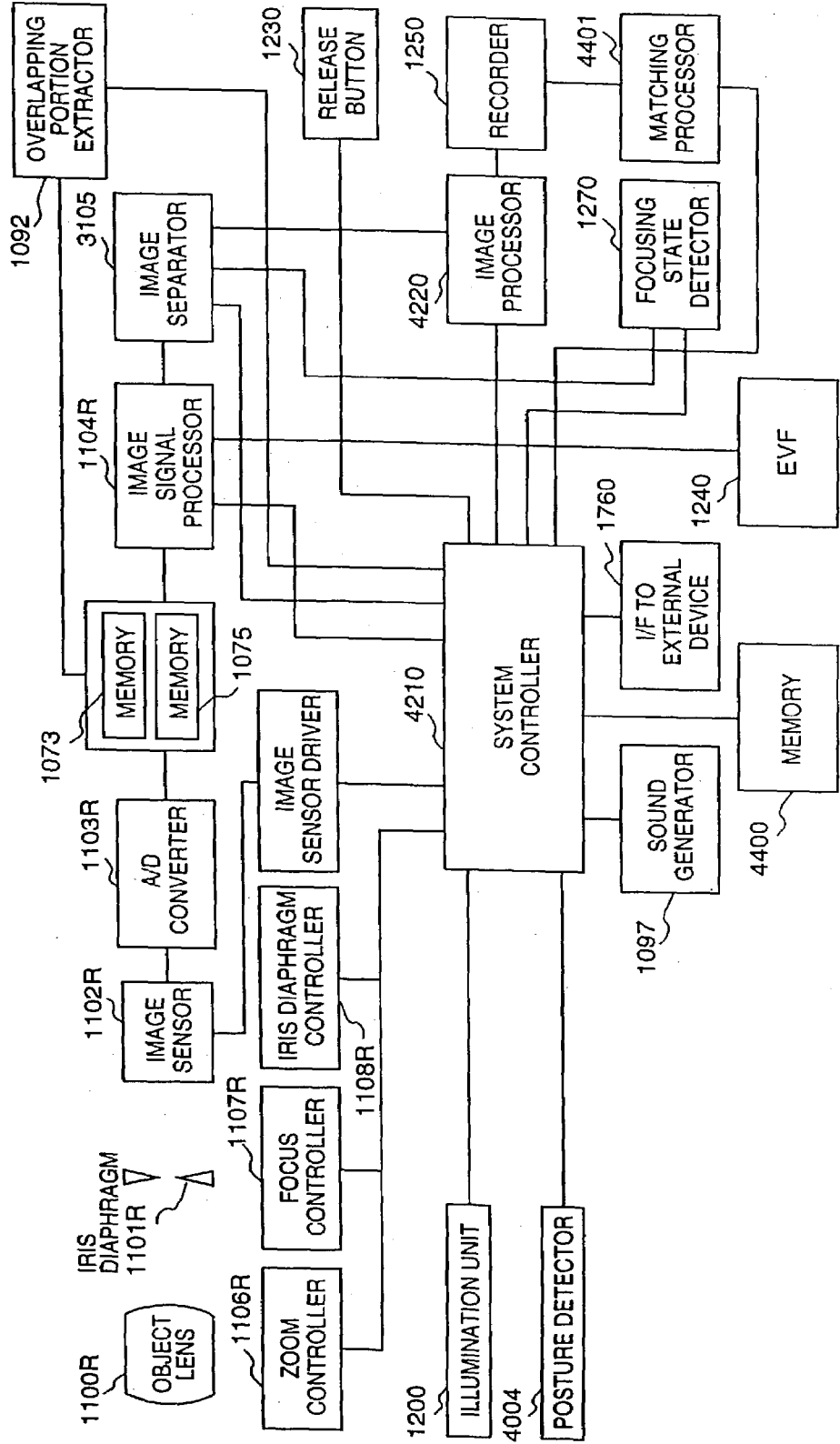
FIG. 39 is a block diagram illustrating a configuration of a three-dimensional shape extraction apparatus according to the second modification of the second embodiment.
Figure 40:
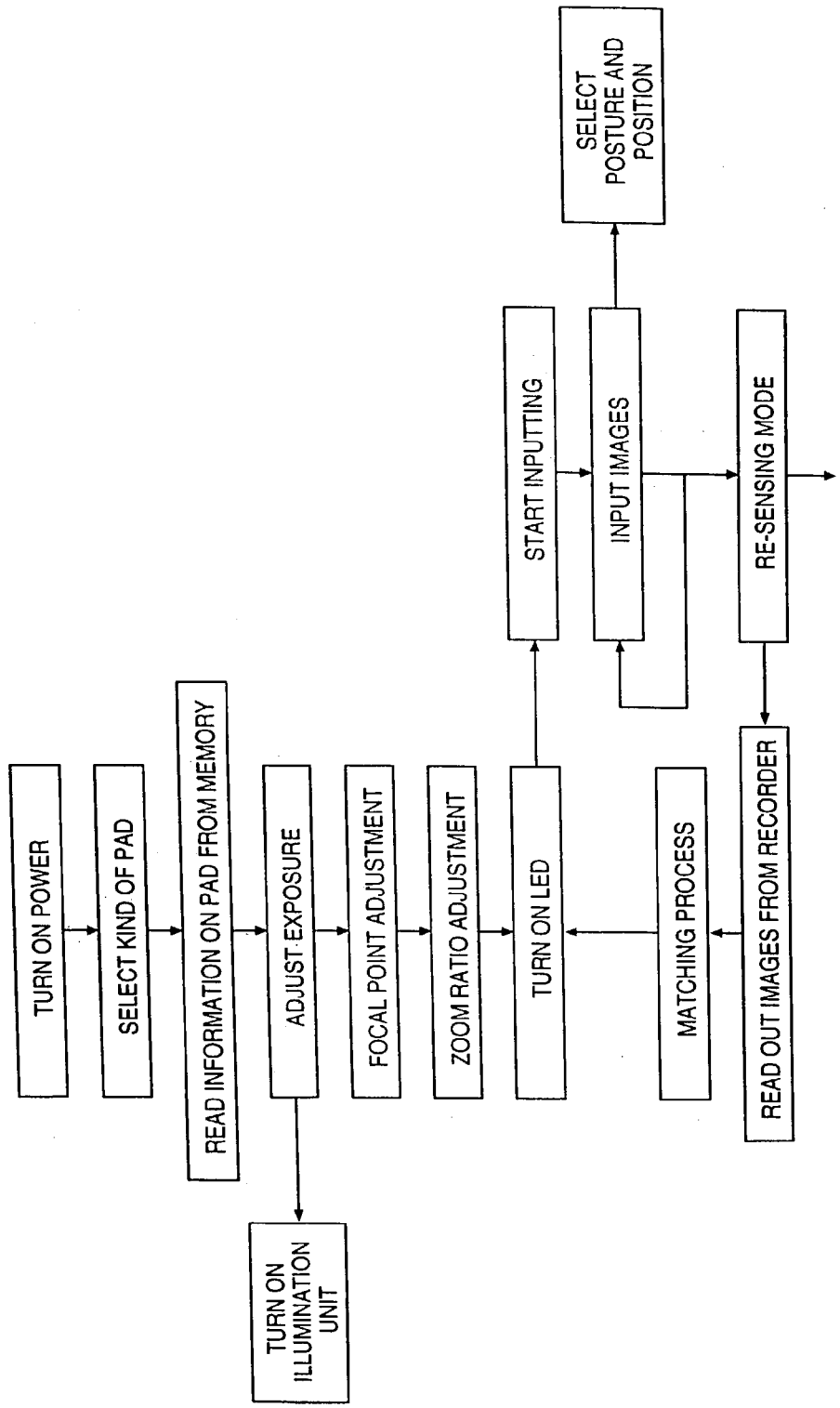
FIG. 40 is a flowchart showing a processing by the three-dimensional shape extraction apparatus according to the second modification of the second embodiment.

FIG. 39 is a block diagram illustrating a configuration of a three-dimensional shape extraction apparatus according to the second modification of the second embodiment. The second modification of the second embodiment corresponds to the second modification of the first embodiment. This second modification is characterized in that images can be re-sensed by using a popularity of pads similarly to the ones used in the first modification.

Referring to FIG. 39, information on the plurality of pads is stored in a memory 4400. The I/F 1760 to an external device connects to a computer, or the like, for receiving information. The kinds of pads can be selected through the I/F 1760.

The recorder 1250 stores three-dimensional shape information along with the image sensing parameters. It also has a function of reading out stored information when necessary. Reference numeral 4210 denotes a system controller which controls the overall operation of the entire apparatus of the second modification.

A matching processor 4401 specifies an image to be re-sensed out of the images stored in the recorder 1250. Therefore, the matching processor 4401 searches the same image as the one which is currently sensed, from the images stored in the recorder 1250 by using a matching method.

Next, an operation of the three-dimensional shape extraction apparatus of the second modification of the second embodiment will be explained. The flow of the operation according to the second modification is shown in FIG. 38.

In the apparatus according to the second modification, a user selects a kind of pad to be used when starting inputting. The system controller 4210 reads out information indicating characteristics of the selected pad from the memory for pads 4400 in accordance with the information on designation to select a pad.

Then, as shown in the flowchart in FIG. 38, the similar processes as in the first modification are performed to start inputting images of an object, then its three-dimensional shape information is extracted. Here, if the user wants to re-sense an image, then selects a re-sensing mode through the I/F 1760.

Then, the controller 4210 sequentially reads out images which have been recorded by the recorder 1250, and controls the matching processor 4410 to perform a matching process between the read-out images and an image which is currently being sensed.

When the correspondence is found between the image which is currently being sensed and the read-out image in the matching process, an LED of the EVF 1240 is turned on to notify the user that the apparatus is ready for input.

Note, upon re-sensing an image, it is possible to change the position of the object 2101 on the pad 2102. In such a case, the matching process is also performed between the image which have been recorded and an image which is currently being sensed, then the matching image which was sensed before is replaced with the image which is currently being sensed.

Further, in a case of terminating the input operation and starting over from the beginning of the input operation, the recorder 1250 reads out the three-dimensional shape information and image signals as well as image sensing parameters which have been recorded, then the input operation is started by setting the image sensing parameters to the same ones used in the previous image sensing operation.

Further, if the user wants to use a pad 2120 which is not registered in the memory 4400 in advance, then information of the pad 2120 is set from a computer, or the like, through the I/F 1760.

<Third Modification of the Second Embodiment>

It is possible to operate in the three-dimensional image sensing mode in addition to the three-dimensional shape information extraction mode by using the image sensing systems explained in the second embodiment. In other words, it is possible to provide images to be seen as three-dimensional images by using a plurality of image sensing systems.

It is possible to select either the three-dimensional image sensing mode or the three-dimensional shape information extraction mode by using the external input I/F 1760.

An operation of the image sensing apparatus in the three-dimensional image sensing mode is described next.

In a case where the three-dimensional image sensing mode is selected through the I/F 1760, images sensed by the right and left image sensing systems are outputted.

Figure 41:
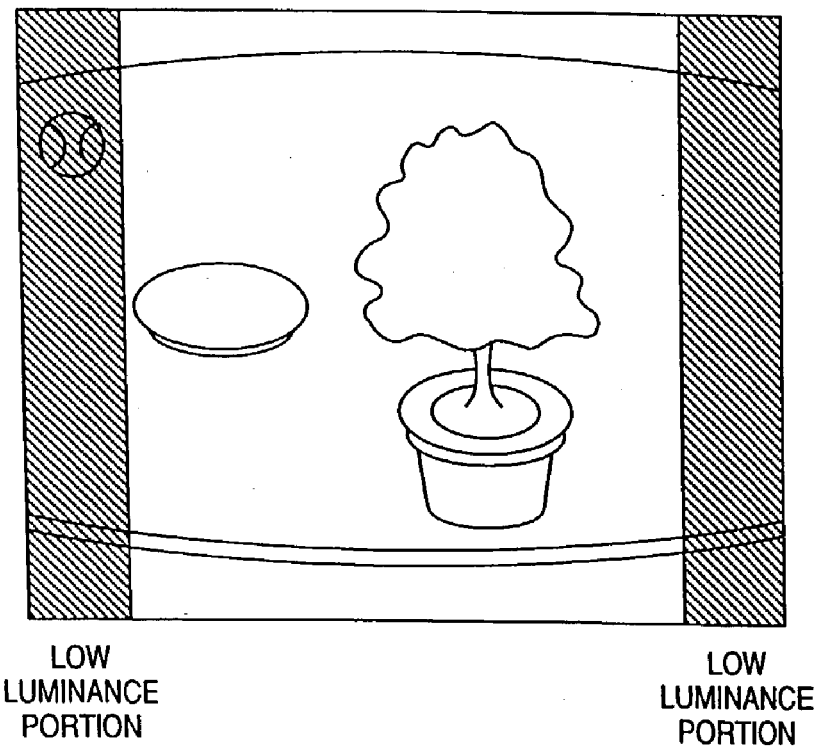
FIG. 41 is an example of an image seen on a finder according to a third modification of the second embodiment.

Further, since an overlapping portion in the right and left images can be obtained by calculating correlation between the images stored in the memories 1073R and 1073L, non-overlapping portions are shown in a low luminance level in the EVF 1240 as shown in FIG. 41 so that the overlapping portion corresponding to the image sensed by the right image sensing system can be distinguished. In FIG. 41, when an object on a table is to be sensed, both right and left end portions of the image on the EVF 1240 are expressed in a low luminance level. Since a ball is in the left end portion of the image which is expressed in the low luminance level, a user can easily recognize that it can not be seen as a three-dimensional image.

In contrast, the user can easily know that a tree and a plate in the central portion of the image can be displayed as an three-dimensional image. Thus, the portion which can be displayed as an three-dimensional image is seen clearly. Then, as the user presses the release button 1230, the right and left images are compressed in accordance with JPEG, and recorded by the recorder 1250.

<Fourth Modification of the Second Embodiment>

It may be considered to make the EVF 1240 as an optical system in order to provide the image sensing apparatus at low price. With an optical finder, it is impossible to display an image which has been sensed previously on it.

Furthermore, since an image sensing area and an observation area of an optical finder do not match if not the optical finder is a TTL finder, there is a possibility to fail in an image sensing operation, because the user may not notice an overlapping area even though there is the one.

The fourth modification is for providing a variety of functions described in this specification at low cost. More concretely, an LED is provided within or vicinity of the field of view of an optical finder, and the LED is tuned on and off in accordance with output from a correlation detector. For example, in a case where there is an overlapping area, the LED is turned on, whereas there is not, the LED is turned off. Thereby, the image sensing apparatus can be provided at low price.

Further, a plurality of LEDs may be provided both in the X and Y directions, and the LEDs in the overlapping portion are turned on. In this manner, not only the existence of any overlapping portion but also ratio of the overlapping portion to the display area can be recognized, thus easier to notice.

Furthermore, by making a frame of the field of view of the optical finder with liquid crystal, an overlapping portion can be notified more precisely than using the LEDs.

<Fifth Modification of the Second Embodiment>

A scheme of extracting three-dimensional shape information and a basic structure of the apparatus are the same as those shown in FIG. 15.

However, the image sensing systems do not have a function to input three-dimensional shape information, and the inputting operation may be performed by executing an image input program installed in a computer, for example. Upon executing the input program, a user places an object to be measured on a pad.

Then, in response to a command inputted by the user to execute the image input program installed in the computer from an input device, a window (referred as "finder window", hereinafter) which corresponds to a finder of a camera is generated on a display device of the computer. Then, when the user turns on the switch of the camera, an image sensed by the camera is displayed in the finder window.

The user performs framing while watching the displayed image so that the image of the object is displayed in about the center, then presses the shutter. Thereafter, the image of the object is scanned to obtain image data of the object. The image data is processed by a processing apparatus which is exclusively for a camera, and by other processing apparatus, thereby three-dimensional data of the object is obtained.

The present invention can be applied to a system constituted by a plurality of devices, or to an apparatus comprising a single device. Furthermore, the invention is applicable also to a case where the object of the invention is attained by supplying a program to a system or apparatus.

The present invention is not limited to the above embodiments and various changes and modifications can be made within the spirit and scope of the present invention. Therefore to appraise the public of the scope of the present invention, the following claims are made.

What is claimed is:

1. An image sensing apparatus which senses images of a first subject whose three-dimensional image is to be extracted, comprising:

image sensing means being movable; and adjustment means for adjusting image sensing parameters of said image sensing means when said image sensing means moves and senses images of the first subject together with a second subject, which is different from the first subject and has a predetermined pattern, from different points around the first subject such that the first subject and the second subject always fall within a common field of view of said image sensing means.

2. The image sensing apparatus which senses a subject with image sensing means from a plurality of positions and postures, comprising:

storage means for storing a plurality of images of the subject sensed from the plurality of positions and postures;

means for moving said image sensing means to an arbitrary position and posture and sensing a first image of the subject;

means for searching a second image which includes an image area overlapping the first image out of the plurality of images stored in said storage means; and means for replacing the second image with the first image.

* * * * *

UNITED STATES PATENT AND TRADEMARK OFFICE
CERTIFICATE OF CORRECTION

PATENT NO. : 7,164,786 B2  
APPLICATION NO. : 10/429686  
DATED : January 16, 2007  
INVENTOR(S) : Katayama et al.

Page 1 of 1

It is certified that error appears in the above-identified patent and that said Letters Patent is hereby corrected as shown below:

In col. 10, line 53, replace "86" with --S6--.

In col. 10, line 62, replace "7A and 7D" with --7A to 7D--.

Figure 7B:
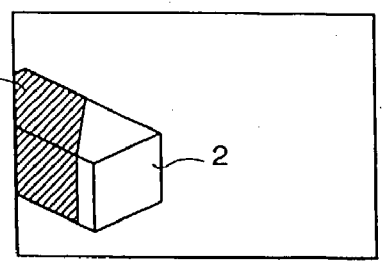
Figure 7C:
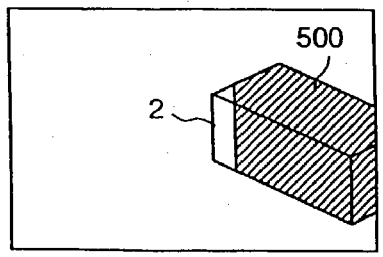
Figure 7D:
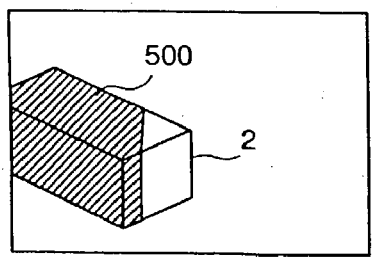

In col. 11, line 7, replace "FIG. 7A" with --FIGS. 7A and 7B--.

Signed and Sealed this

Fifth Day of June, 2007

JON W. DUDAS  
*Director of the United States Patent and Trademark Office*